US008750937B2

(12) United States Patent
Suzuki et al.

(10) Patent No.: US 8,750,937 B2
(45) Date of Patent: Jun. 10, 2014

(54) MOBILE TERMINAL DEVICE AND PROGRAM USED IN MOBILE TERMINAL DEVICE

(75) Inventors: Toshiyuki Suzuki, Yokohama (JP); Toshihiro Azami, Yokosuka (JP); Hiroshi Inamura, Yokosuka (JP); Takeshi Tomimori, Itami (JP); Keisaku Fukuda, Fujisawa (JP); Takenori Kawamata, Fujisawa (JP)

(73) Assignee: NTT DoCoMo, Inc., Tokyo (JP)

( * ) Notice: Subject to any disclaimer, the term of this patent is extended or adjusted under 35 U.S.C. 154(b) by 584 days.

(21) Appl. No.: 11/521,299

(22) Filed: Sep. 15, 2006

(65) Prior Publication Data

US 2007/0063988 A1    Mar. 22, 2007

(30) Foreign Application Priority Data

Sep. 16, 2005  (JP) ................ P2005-270342

(51) Int. Cl.
    *H04W 88/02*  (2009.01)
(52) U.S. Cl.
    USPC .......................... 455/566; 455/41.2
(58) Field of Classification Search
    USPC ............. 455/566, 90; 345/168, 173–183
    See application file for complete search history.

(56) References Cited

U.S. PATENT DOCUMENTS

| | | | | |
|---|---|---|---|---|
| 5,311,175 A | * | 5/1994 | Waldman | 341/34 |
| 6,055,439 A | * | 4/2000 | Helin et al. | 455/550.1 |
| 7,107,079 B2 | * | 9/2006 | Shimabukuro | 455/566 |
| 8,255,001 B2 | * | 8/2012 | Hardy et al. | 455/564 |
| 2001/0043189 A1 | | 11/2001 | Brisebois et al. | |
| 2002/0057259 A1 | * | 5/2002 | Suzuki | 345/168 |
| 2004/0029611 A1 | * | 2/2004 | Nagao | 455/550.1 |
| 2005/0143137 A1 | * | 6/2005 | Matsunaga et al. | 455/566 |

FOREIGN PATENT DOCUMENTS

| | | |
|---|---|---|
| CN | 1353528 A | 6/2002 |
| EP | 0 859 498 A2 | 8/1998 |
| EP | 1 309 158 A2 | 5/2003 |
| JP | 8-16292 | 1/1996 |
| JP | 8-286829 | 11/1996 |
| JP | 10-187339 | 7/1998 |

(Continued)

OTHER PUBLICATIONS

U.S. Appl. No. 11/521,536, filed Sep. 15, 2006, Suzuki, et al.

(Continued)

*Primary Examiner* — Ajit Patel
*Assistant Examiner* — Julio Perez
(74) *Attorney, Agent, or Firm* — Oblon, Spivak, McClelland, Maier & Neustadt, L.L.P.

(57) ABSTRACT

A mobile terminal device, which is provided with the plurality of keys, includes: a detection interface for detecting touching any of the keys by a user; a press detection interface for detecting pressing the key by the user; a controller for executing a first function assigned to the key at the time of detection of the user touching the key in a case where touching time period, for which the user touches the key, is equal to, or longer than, a predetermined judging time, and for executing a second function assigned to the key at the time of detection of the user touching the key in a case where the touching time period is shorter than the predetermined judging time; and an output controller for displaying an explanation on the first function on a display unit in a case where the touching time period is equal to, or longer than, the predetermined judging time.

9 Claims, 27 Drawing Sheets

(56) References Cited

FOREIGN PATENT DOCUMENTS

| | | |
|---|---|---|
| JP | 2000-278374 | 10/2000 |
| JP | 2002-149308 | 5/2002 |
| JP | 2003-60741 | 2/2003 |
| JP | 2003-271295 | 9/2003 |
| JP | 2003-298716 | 10/2003 |
| WO | WO 92/08285 | 5/1992 |

OTHER PUBLICATIONS

Office Action issued Jul. 13, 2010, in Japanese Patent Application No. 2005-270342, filed Sep. 16, 2005 (with English-language Translation).

Office Action issued Sep. 2, 2010, in Chinese Patent Application No. 200610153441.0 (with English language translation).

Chinese Office Action issued Jun. 2, 2011, in Patent Application No. 200610153441.0 (with English-language translation).

* cited by examiner

FIG. 4

| KEY TYPE | FIRST FUNCTION (SPEED DIALING) | SECOND FUNCTION (NUMBER INPUT) |
|---|---|---|
| 1 | USER A | 1 |
| 2 | USER B | 2 |
| 3 | USER C | 3 |
| 4 | USER D | 4 |
| 5 | USER E | 5 |
| 6 | USER F | 6 |
| 7 | NOT ASSIGNED | 7 |
| 8 | NOT ASSIGNED | 8 |
| 9 | NOT ASSIGNED | 9 |
| * | NOT ASSIGNED | * |
| 0 | NOT ASSIGNED | 0 |
| # | NOT ASSIGNED | # |

PRESS KEY "5"

PRESS KEY "0"

MOVE FINGER FROM KEY "1" TO KEY "2"

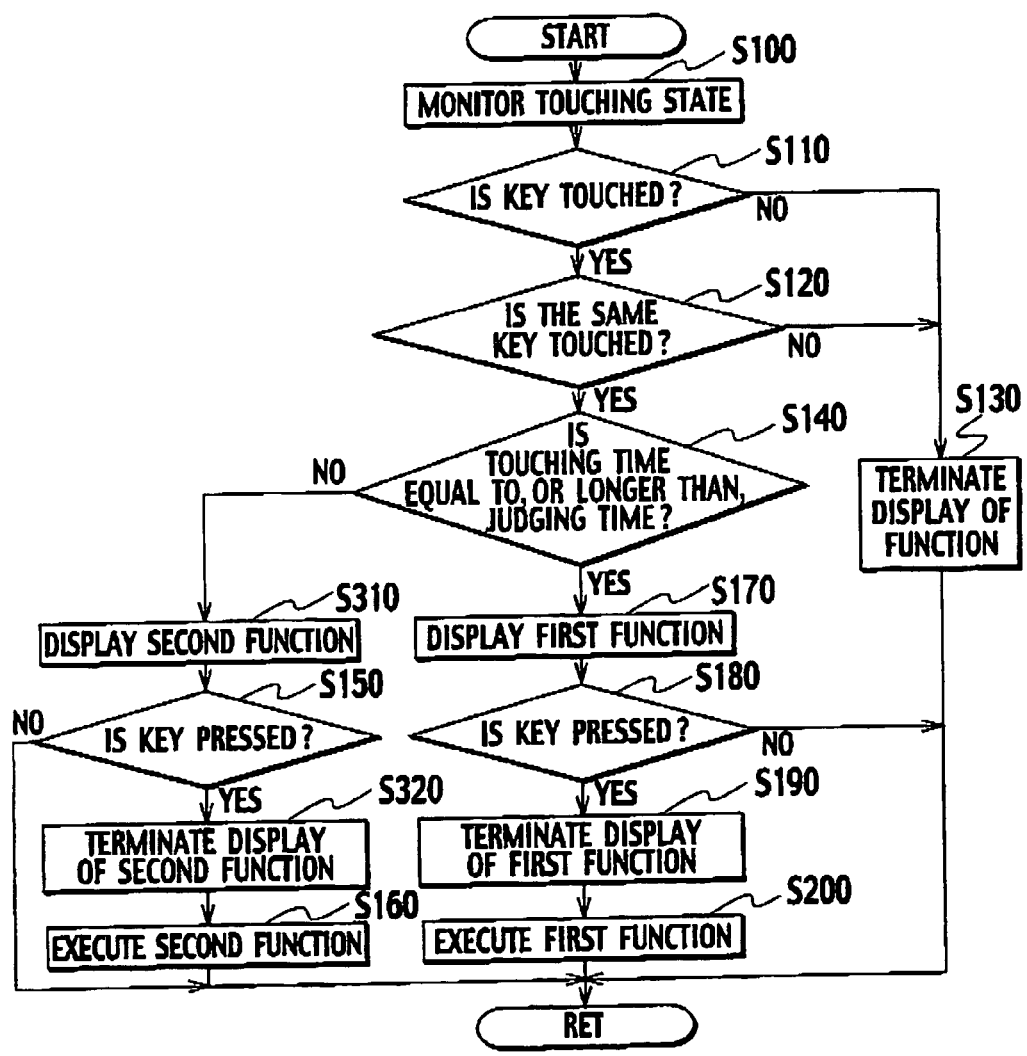

SHORT TOUCH ON KEY "S/W(1)"

PRESS "S/W (1)" KEY

LONG TOUCH ON KEY "S/W(1)" KEY

PRESS "S/W (1)" KEY

FIG. 17

| KEY TYPE | FIRST FUNCTION | SECOND FUNCTION |
|---|---|---|
| 1 | BAR CODE READER | CUSTOMIZE |
| 2 | INFRARED TRANSMISSION | CAMERA |
| 3 | INFRARED RECEPTION | MEMORY STICK |
| 4 | VOICE MEMO | SETTINGS |
| 5 | MY PICTURES | DATA BOX |
| 6 | CHAT MAIL | USEFUL FUNCTIONS |
| 7 | VOICE RECORDER | MAIL |
| 8 | ALARM | INTERNET |
| 9 | CALCULATOR | APPLICATION |
| * | NOT ASSIGNED | NOT ASSIGNED |
| 0 | NOT ASSIGNED | NOT ASSIGNED |
| # | NOT ASSIGNED | NOT ASSIGNED |

SHORT TOUCH ON "1" KEY

MOVE FINGER TO "5" KEY

PRESS "5" KEY

LONG TOUCH ON "1" KEY

MOVE FINGER TO "5" KEY

PRESS "5" KEY

LONG TOUCH ON "1" KEY

MOVE FINGER TO "9" KEY

PRESS "9" KEY

MOBILE TERMINAL DEVICE AND PROGRAM USED IN MOBILE TERMINAL DEVICE

CROSS REFERENCE TO RELATED APPLICATIONS

This application is based upon and claims the benefit of priority from the prior Japanese Patent Application No. P2005-270342, filed on Sep. 16, 2005; the entire contents of which are incorporated herein by reference.

BACKGROUND OF THE INVENTION

1. Field of the Invention

The present invention relates to a mobile terminal device provided with a plurality of keys to each of which a plurality of functions are assigned, and to a program used in this mobile terminal device.

2. Description of the Related Art

As a mobile terminal device such as a mobile telephone or a personal digital assistant (PDA), a mobile terminal device, which is provided with function keys for calling functions installed therein, has heretofore been widely known. Moreover, a mobile terminal device, in which a plurality of functions are assigned to a single function key, has also been known. This is because it is preferable that a mobile terminal device not be provided with a large number of function keys when portability of the mobile terminal device is focused.

In such a mobile terminal device, for example, a key is assigned to a function for inputting a character corresponding to that assigned to the key in a case where the key is pressed for a period of time shorter than a predetermined judging time (in the case of a "normal press"). The key is assigned to a function for calling an edit screen for a mail in a case where the key is pressed for a period of time longer than the predetermined judging time (in the case of a "longer press") (see Japanese Patent Application Laid-open No. 2003-60741, for example).

In addition, there is also known a mobile terminal device in which a function to call an address book, a function to call a screen for changing a ring tone, a function to start a game, a function to call a screen for editing a schedule, and so forth are assigned to the respective keys (see Japanese Patent Application Laid-open No. 2003-298716, for example).

Meanwhile, there is also known a mobile terminal device in which an explanation (a preview) on a function to be executed is displayed in a display area when a key is pressed, in order to enhance user-friendliness.

Specifically, such a mobile terminal device detects key touch by a user in addition to key press by the user, and displays the explanation on the function in the display area at the time of detecting the key touch (see Japanese Patent Application Laid-open No. 2003-149308, for example).

However, the mobile terminal device is generally provided with small keys since the portability of the mobile terminal device is important.

Hence, in the mobile terminal device configured to execute different functions respectively in response to the "normal press" and the "long press" on a certain key, it is difficult to print explanations on the functions respectively corresponding to the "normal press" and the "long press" on the key. For example, in a case where the explanation on the function corresponding to the "normal press" is printed on the key and the explanation on the function corresponding to the "long press" is not printed thereon, a user has to memorize the function corresponding to the "long press" on the key.

On the other hand, in the mobile terminal device configured to display the explanation on the function in the display area at the time of detecting the key touch by the user, it is assumed that only one function (the function corresponding to the "normal press") is assigned to each of the keys. Specifically, in such a mobile terminal device, displaying of the explanation on the function is triggered by the key touch. Accordingly, even when the plurality of functions are assigned to one key, it is difficult to cause the user to notice that the explanation displayed in the display area represents the explanation on the function corresponding to the "long press".

SUMMARY OF THE INVENTION

The present invention has been made to solve the foregoing problem. It is an object of the present invention to provide a mobile terminal device with which user-friendliness can be enhanced even in a case where there are limitations on key sizes thereof, and where a plurality of functions are assigned to each of the keys, and to provide a program used in this mobile terminal device.

A first aspect of the present invention provides a mobile terminal device, which has a plurality of keys (keys 30), and which includes: a touch detector (a touch pad 10b and a touch detection interface 11) configured to detect touching any of the keys by a user; a press detector (a press detection interface 12) configured to detect pressing any of the keys by the user; a function executor (a controller 14) configured to execute, when the press detector detects the touching any of the keys by the user, a first function assigned to the key in a case where touching time period representing a time period, for which the user touches the key, is equal to, or longer than, predetermined judging time, and to execute, when the press detector detects the touching any of the keys by the user, a second function assigned to the key in a case where the touching time period for which the user touches the key is shorter than the predetermined judging time; and an output unit (a display controller 15) configured to output an explanation on the first function in a case where the touching time period is equal to, or longer than, the predetermined judging time.

According to this aspect, the output unit outputs the explanation on the first function, which is to be executed when the key is pressed for the touching time period equal to, or longer than, the predetermined judging time, in a case where the touching time period is equal to, or longer than, the predetermined judging time. That is, the mobile terminal device makes it possible for the user to easily notice that the explanation outputted by the output unit represents the explanation on the first function by corresponding the output of the explanation on the first function to the touching time period for the key.

Thus, the mobile terminal device makes it possible to improve user-friendliness even in a case where there are limitations on key sizes, and where a plurality of functions are assigned to each of the keys.

A second aspect of the present invention provides the mobile terminal device according to the first aspect, wherein, after the touching time period for a certain key, which is one of the keys, reaches the time equal to, or longer than, the predetermined touching time period, in a case where the touch detector detects the touching a different key by the user, which is one of the keys, the output unit outputs the explanation on the first function assigned to the different key even when the touching time period for the different key is shorter than the predetermined judging time.

A third aspect of the present invention provides the mobile terminal device according to the first aspect, in which the output unit outputs an explanation on the second function assigned to the key in a case where the touching time period is shorter than the predetermined judging time.

A fourth aspect of the present invention provides the mobile terminal device according to the first aspect, in which different first functions are assigned to the plurality of keys respectively; and the output unit outputs explanations on the plurality of first functions assigned to a key included in the plurality of keys in a case where the touching time period for the key is equal to, or longer than, the predetermined judging time.

A fifth aspect of the present invention provides the mobile terminal device according to the first aspect, in which different second functions are respectively assigned to the plurality of keys; and the output unit outputs explanations on the plurality of second functions assigned to a key included in the plurality of keys in a case where the touching time period for the key is shorter than the predetermined judging time.

A sixth aspect of the present invention provides a program used in a mobile terminal device having the plurality of keys, the program causing the mobile terminal device to execute the steps of: detecting touching any of the keys by a user; detecting pressing any of the keys by the user; executing a first function assigned to the key, when the touching any of the keys by the user is detected, in a case where touching time period representing a time period, for which the user touches the key, is equal to, or longer than, predetermined judging time, executing a second function assigned to the key in a case where the touching time period is shorter than the predetermined judging time; and outputting an explanation on the first function in a case where the touching time period is equal to, or longer than, the predetermined judging time.

According to the present invention, it is made possible to provide a mobile terminal device with which user-friendliness can be enhanced even in a case where there are limitations on key sizes, and where the plurality of functions are assigned to each of the keys, and to provide a program used in this mobile terminal device.

BRIEF DESCRIPTION OF THE DRAWINGS

FIG. 4 is a table showing key assignment information according to the first embodiment of the present invention.

FIG. 11 is a table showing key assignment information according to a third embodiment of the present invention.

FIG. 12 is a flowchart showing operations of a mobile terminal device 100 according to the third embodiment of the present invention.

FIG. 17 is a table showing key assignment information according to a fourth embodiment of the present invention.

DETAILED DESCRIPTION OF THE PREFERRED EMBODIMENTS

Figure 1:
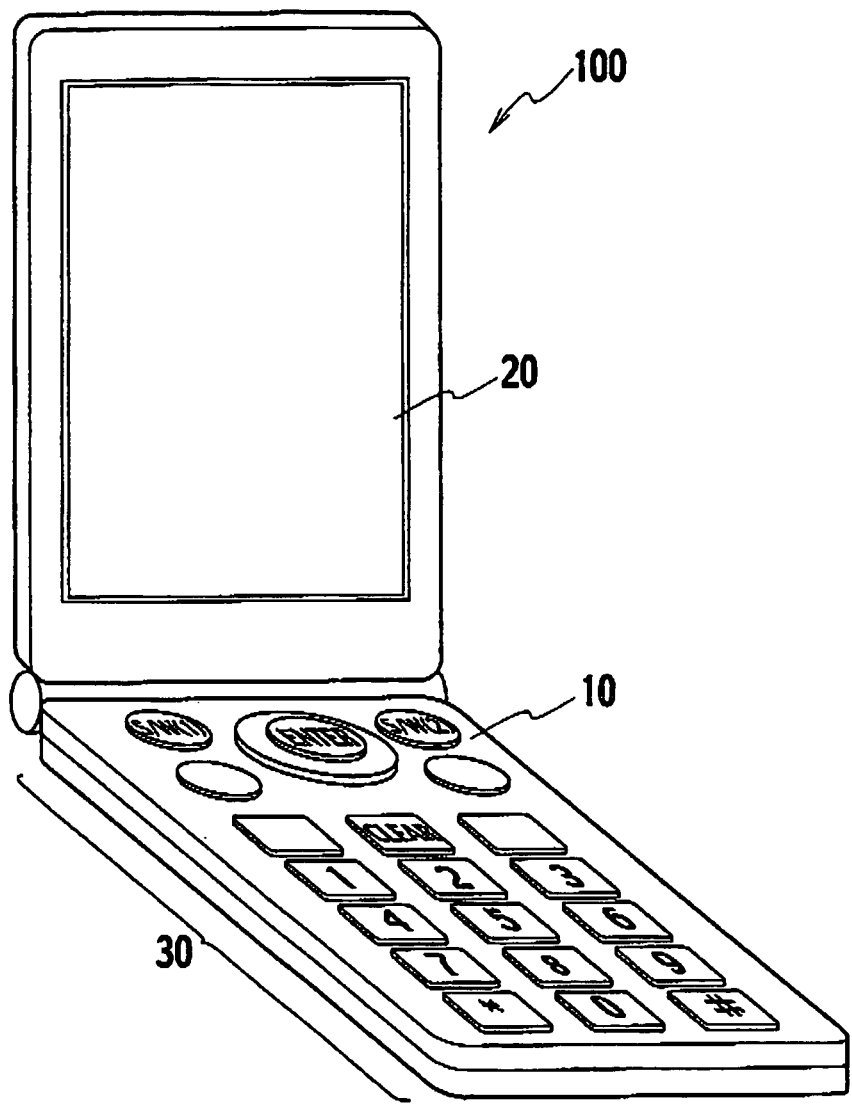
FIG. 1 is an external view showing a mobile terminal device 100 according to a first embodiment of the present invention.

Hereinafter, mobile terminal devices according to embodiments of the present invention will be described with reference to the accompanying drawings. In the description of the drawings, identical or similar constituents are designated by identical or similar reference numerals. It is to be noted, however, that the drawings are schematic, and that proportions of the respective dimensions and other factors may be different from actual features.

First Embodiment (Configuration of Mobile Terminal Device)

Descriptions will be provided below for a configuration of a mobile terminal device according to a first embodiment of the present invention with reference to the accompanying drawings. FIG. 1 is an external view showing a mobile terminal device 100 according to the first embodiment of the present invention.

As shown in FIG. 1, the mobile terminal device 100 includes a main unit 10 and a display unit 20. The main unit 10 has a plurality of keys 30. In this event, the keys 30 refer to keys such as "0" to "9", "*", "#" and "clear", and software keys.

The main unit 10 includes a control board 10c to be described later, and executes functions assigned to the keys 30 which are pressed. Incidentally, the functions include a function to input characters, a function for speed dialing, a function to call various screens, a function to start various applications, and a function to output various contents.

The explanations and the like on the respective functions are displayed on the display unit 20. In addition, any of the various screens called by the function, any of the various applications activated by the function, or the like, is displayed on the display unit 20.

Figure 2:
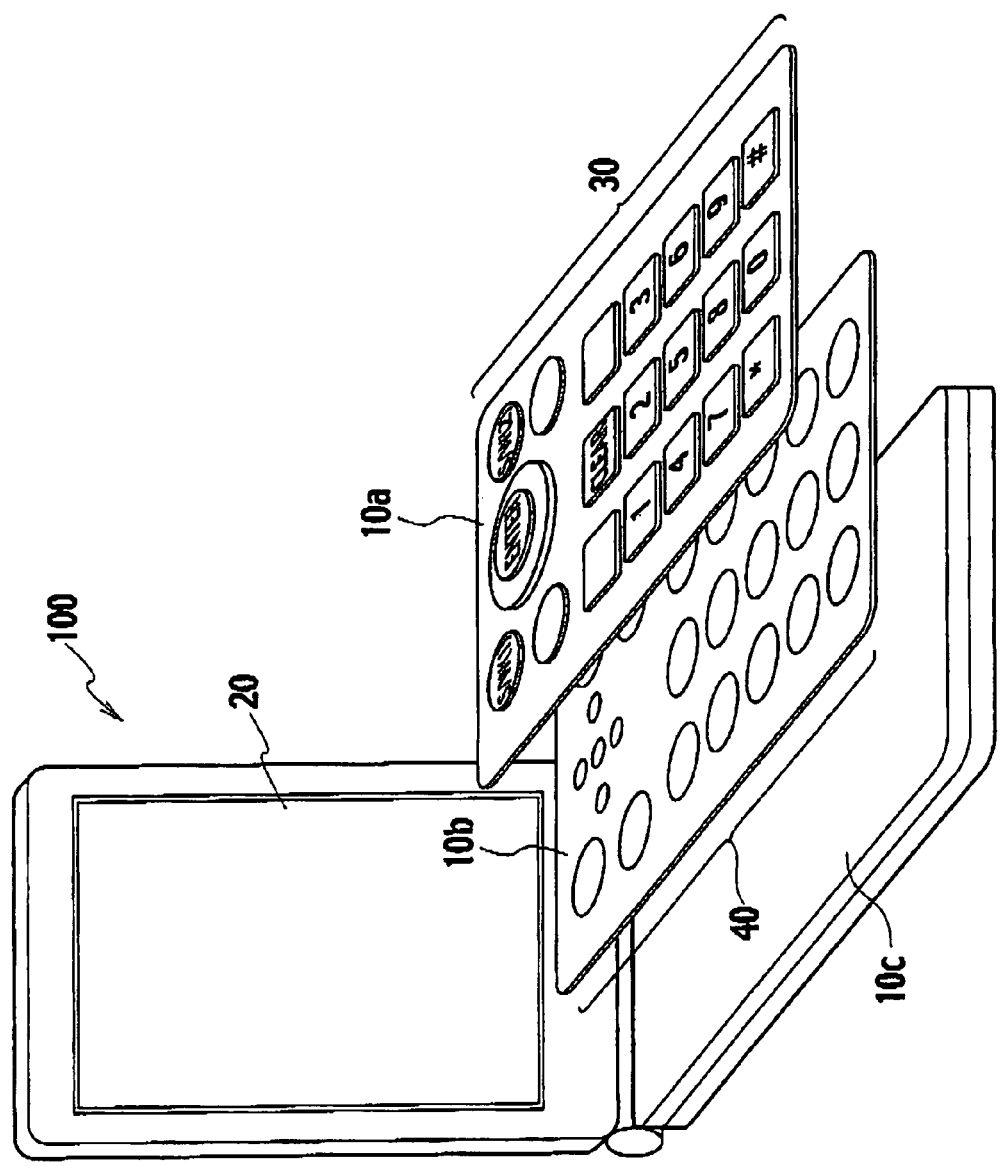
FIG. 2 is an exploded view showing the mobile terminal device 100 according to the first embodiment of the present invention.

FIG. 2 is an exploded view showing the mobile terminal device 100 according to the first embodiment of the present invention. As shown in FIG. 2, the main unit 10 includes a key-arranged surface 10a, a touch pad 10b, and the control board 10c.

The key-arranged surface 10a is a sheet member for holding the keys 30, and includes a plurality of holes (not shown) in which the keys 30 fit.

The touch pad 10b detects touches on the respective keys 30 by a user. Incidentally, the touch pad 10b can also detect a continuous touch on any of the keys 30 by the user.

The control board 10c controls the mobile terminal device 100 in response to detection by the touch pad 10b. Details of the control board 10c will be described later (see FIG. 3).

(Configuration of Control Board)

Figure 3:
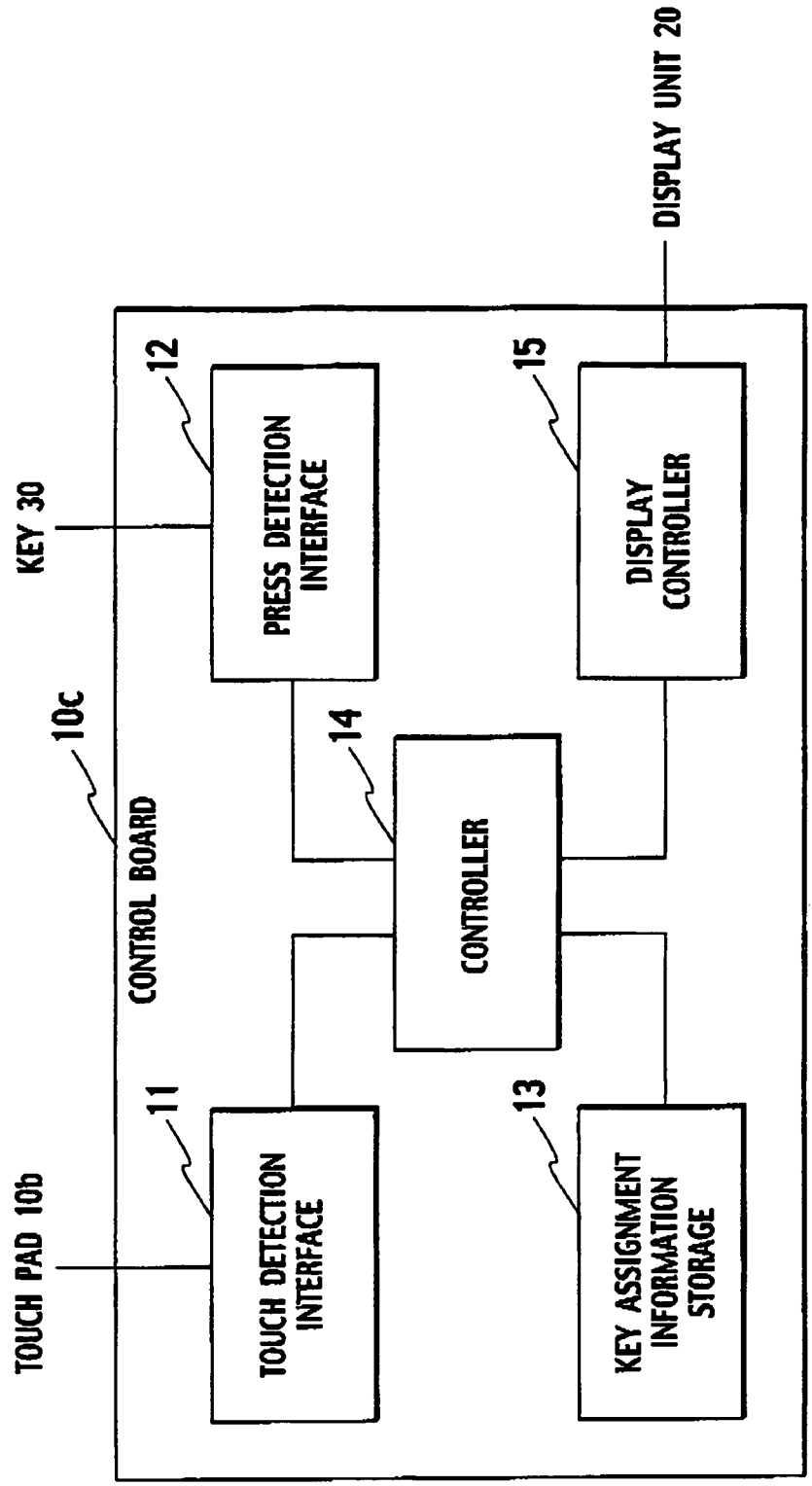
FIG. 3 is a block diagram showing a control board 10c according to the first embodiment of the present invention.

A configuration of the above-mentioned control board 10c will be described below with reference to the accompanying drawing. FIG. 3 is a block diagram showing the control board 10c according to the first embodiment of the present invention.

As shown in FIG. 3, the control board 10c includes a touch detection interface 11, a press detection interface 12, a key assignment information storage 13, a controller 14, and a display controller 15.

The touch detection interface 11 is connected to the touch pad 10b, and is configured to obtain, from the touch pad 10b, a signal indicating that the user has touched one of the respective keys 30. Note that the touch detection interface 11 obtains the signal continuously from the touch pad 10b in a case where the user continues to touch any of the keys 30.

The press detection interface 12 is connected to each of the keys 30, and is configured to obtain a signal indicating that the user has pressed each of the keys 30.

The key assignment information storage 13 stores information, as key assignment information, which respectively associates the type of the keys 30 with functions assigned to the respective keys 30. In addition, plurality of functions is assigned to each of the keys 30. Details of the key assignment information will be described later (see FIG. 4).

The controller 14 executes the function assigned to one of the keys 30 depending on a time period for which the user touches the key 30 (hereinafter referred to as a touching time period) and on the type of the key 30 pressed by the user. To be more precise, when the user presses one of the keys 30, the controller 14 executes a function (a first function to be described later) assigned to the pressed key 30 in a case where the touching time period for the key 30 is equal to, or longer than, predetermined judging time. On the other hand, the controller 14 executes a function (a second function to be described later) assigned to the key 30, which is pressed, in a case where the touching time period for the key 30 is shorter than the predetermined judging time.

The controller 14 instructs the display controller 15 to display an explanation on the function assigned to one of the keys 30 depending on the touching time period for the key 30 and on the type of the key 30 pressed by the user. To be more precise, the controller 14 instructs the display controller 15 to display an explanation on the function (the first function to be described later) assigned to the key 30, which is touched, in a case where the touching time period for the key 30 is equal to, or longer than, the predetermined judging time when the user presses the key 30. On the other hand, the controller 14 instructs the display controller 15 to display an explanation on the function (the second function to be described later) assigned to the key 30 in a case where the touching time period for the key 30 is shorter than the predetermined judging time.

The display controller 15 displays, on the display unit 20, the explanation on the function assigned to the key 30 in response to the instruction by the controller 14. Incidentally, the explanation on the function may be a character string, an icon for indicating the type of the function, or the like.

(Key Assignment Information)

The above-mentioned key assignment information will be described below with reference to the accompanying drawing. FIG. 4 is a table showing the key assignment information according to the first embodiment of the present invention.

As shown in FIG. 4, the key assignment information is information for associating the type of the keys 30 with the functions assigned to the respective keys 30. The first and second functions are assigned to each of the keys 30. Specifically, when the key 30 is pressed, the first function is executed in a case where the touching time period is equal to, or longer than, the predetermined judging time. Meanwhile, when the key 30 is pressed, the second function is executed in a case where the touching time period is shorter than the predetermined judging time.

For example, to a "1" key, a function to make a phone call to a user A (a speed dialing function) is assigned as the first function, and a function to input a number "1" (a character input function) is assigned as the second function. Similarly, to a "2" key, a function to call a user B (the speed dialing function) is assigned as the first function, and a function to input a number "2" (the character input function) is assigned as the second function.

In the first embodiment, the first function is the speed dialing function, and the second function is the character input function. However, the present invention is not limited to this configuration. The first function and the second function may be modified in consideration of user-friendliness.

(Operations of Mobile Terminal Device)

Figure 5:
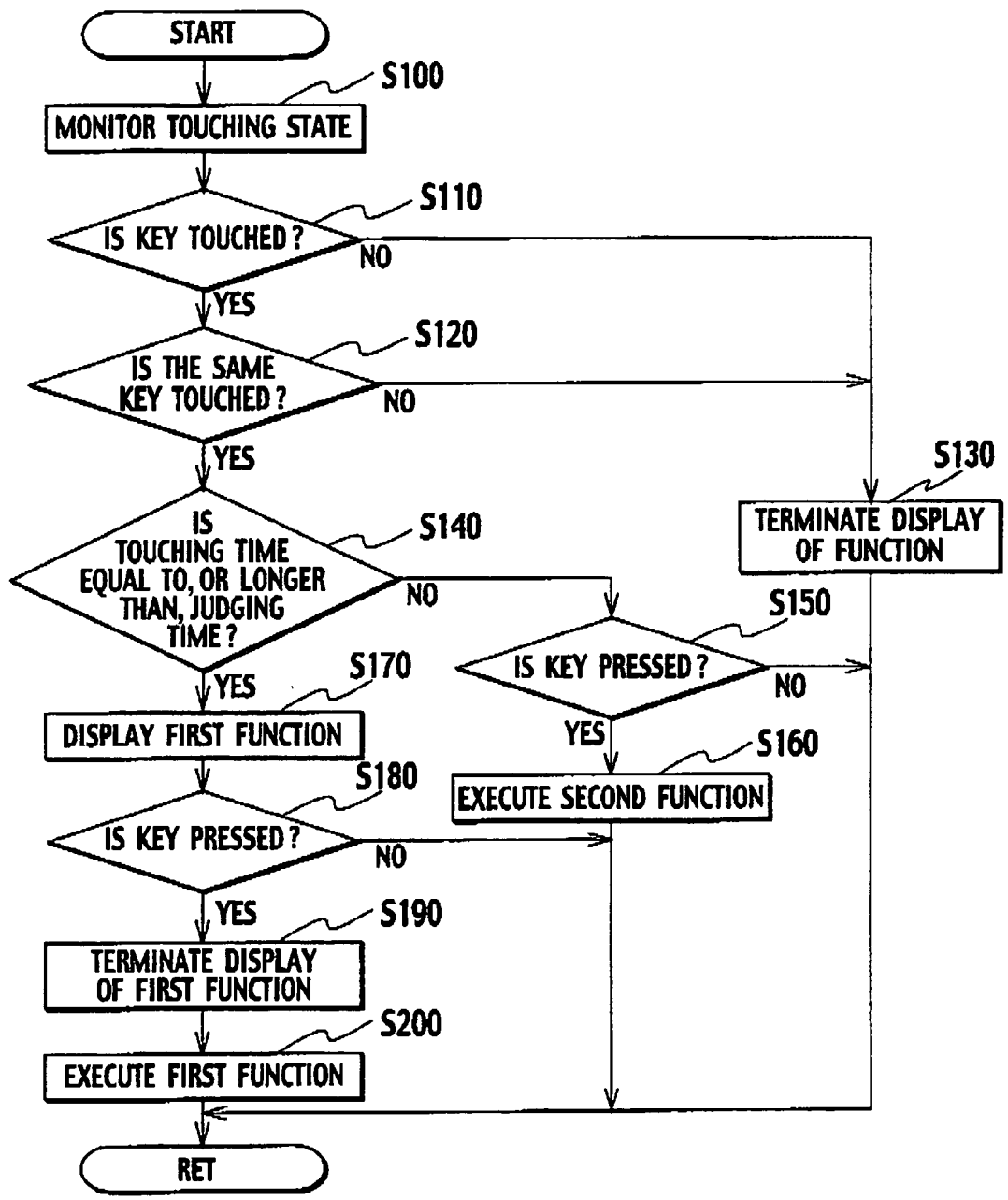
FIG. 5 is a flowchart showing operations of the mobile terminal device 100 according to the first embodiment of the present invention.

Operations of the above-mentioned mobile terminal device 100 will be described below with reference to the accompanying drawing. FIG. 5 is a flowchart showing the operations of the mobile terminal device 100 according to the first embodiment of the present invention.

As shown in FIG. 5, in Step S100, the mobile terminal device 100 monitors a state of touching the keys 30 by a user.

In Step S110, the mobile terminal device 100 judges whether or not the user has touched any of the keys 30. At this time, the mobile terminal device 100 proceeds to processing in Step S120 in a case where the user has touched the key 30. The mobile terminal device 100 proceeds to processing in Step S130 in a case where the user does not touch the key 30.

In Step S120, the mobile terminal device 100 judges whether or not the user continues to touch the same key 30. At this time, the mobile terminal device 100 proceeds to processing in Step S140 in a case where the user continues to touch the key 30. The mobile terminal device 100 proceeds to the processing in Step S130 in a case where the user does not continue to touch the key 30.

In Step S130, the mobile terminal device 100 terminates a display of an explanation either on the first function or on the second function in a case where the explanation on the first function or on the second function is displayed on the display unit 20.

In Step S140, the mobile terminal device 100 judges whether or not the touching time period for the key 30 is equal to, or longer than, the predetermined judging time. The mobile terminal device 100 proceeds to processing in Step S170 in a case where the touching time period is equal to, or longer than, the predetermined judging time. The mobile terminal device 100 proceeds to processing in Step S150 in a case where the touching time period is shorter than the predetermined judging time.

In Step S150, the mobile terminal device 100 judges whether or not the user has pressed the key 30. The mobile terminal device 100 proceeds to processing in Step S160 in a case where the user has pressed the key 30. The mobile terminal device 100 returns to the processing in Step S130 in a case where the user does not press the key 30.

In Step S160, the mobile terminal device 100 executes the second function assigned to the key 30 pressed by the user. For example, in a case where the touching time period for the "1" key, which is pressed by the user, is shorter than the predetermined judging time, the mobile terminal device 100 executes the second function assigned to the "1" key, namely, the function to input a number "1".

In Step S170, the mobile terminal device 100 displays, on the display unit 20, the explanation on the first function assigned to the key 30 touched by the user. For example, in a case where the touching time period for the "1" key is equal to, or longer than, the predetermined judging time, the mobile terminal device 100 displays, on the display unit 20, the explanation on the first function assigned to the "1" key, namely, the function to make a phone call to the user A (such as a name, a telephone number, a portrait, and the like of the user A).

In Step S180, the mobile terminal device 100 judges whether or not the user has pressed the key 30. The mobile terminal device 100 proceeds to processing in Step S190 in a case where the user has pressed the key 30. The mobile terminal device 100 returns to the processing in Step S100 in a case where the user does not press the key 30.

In Step S190, the mobile terminal device 100 terminates the display of the explanation on the first function assigned to the key 30 pressed by the user.

In Step S200, the mobile terminal device 100 executes the first function which is assigned to the key 30 pressed by the user. For example, when the touching time period for the "1" key pressed by the user is equal to, or longer than, the predetermined judging time, the mobile terminal device 100 executes the first function assigned to the "1" key, namely, the function to make a phone call to the user A.

(Display Screen)

Transition of screens to be displayed on the above-mentioned display unit 20 will be described with reference to the accompanying drawings. FIG. 6 to FIG. 9 are views respectively showing screens to be displayed on the display unit 20 according to the first embodiment of the present invention.

Figure 6:
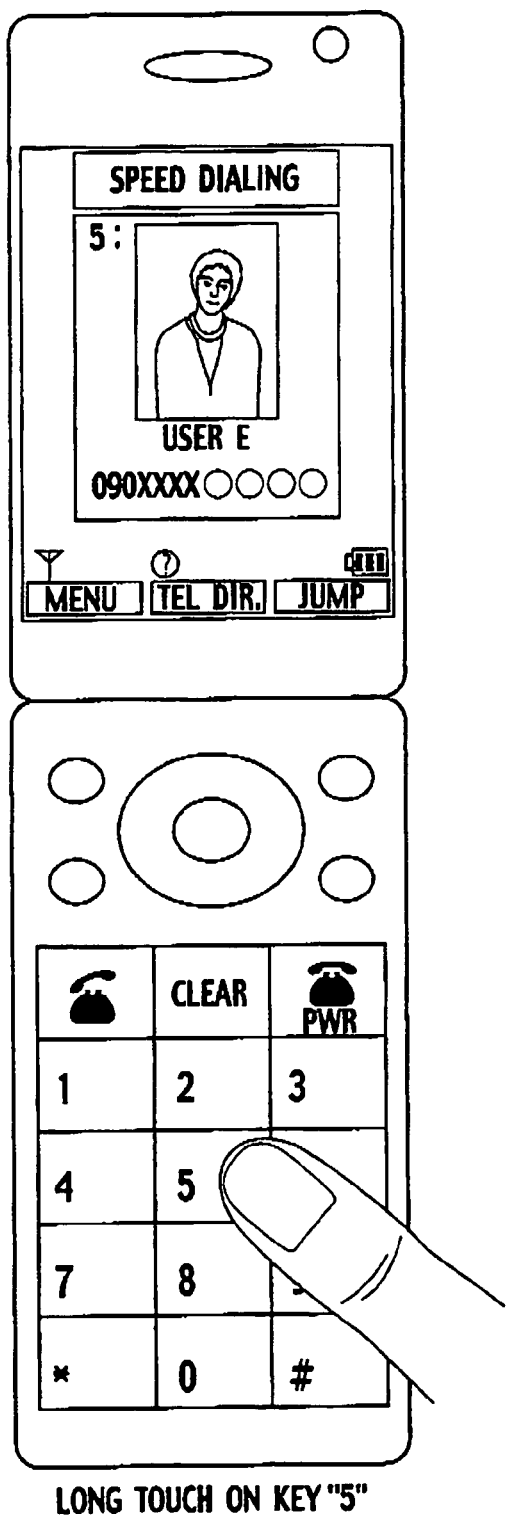
FIG. 6 is a view (part 1) showing a screen to be displayed on a display unit 20 according to the first embodiment of the present invention.

FIG. 6 is a view showing a screen to be displayed on the display unit 20 in a case where the touching time period for a "5" key is equal to, or longer than, the predetermined judging time. As shown in FIG. 6, an explanation on the first function assigned to the key "5", namely, an explanation on a function to make a phone call to a user E (a name, a telephone number, a portrait, and the like of the user E), is displayed on the display unit 20.

Figure 7:
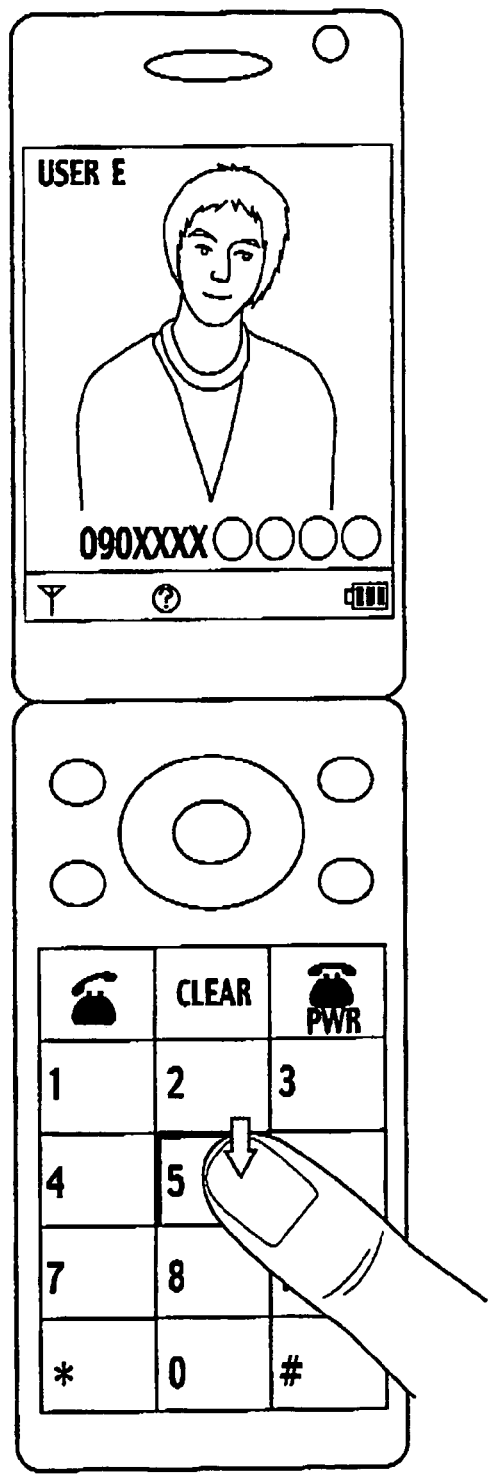
FIG. 7 is a view (part 2) showing the screen to be displayed on the display unit 20 according to the first embodiment of the present invention.

FIG. 7 is a view showing a screen to be displayed on the display unit 20 in a case where the user presses the "5" key in the state shown in FIG. 6. As shown in FIG. 7, the first function assigned to the "5" key, namely, the function to make a phone call to the user E, is executed. The image shown in FIG. 6 is enlarged, and is displayed on the display unit 20.

Figure 8:
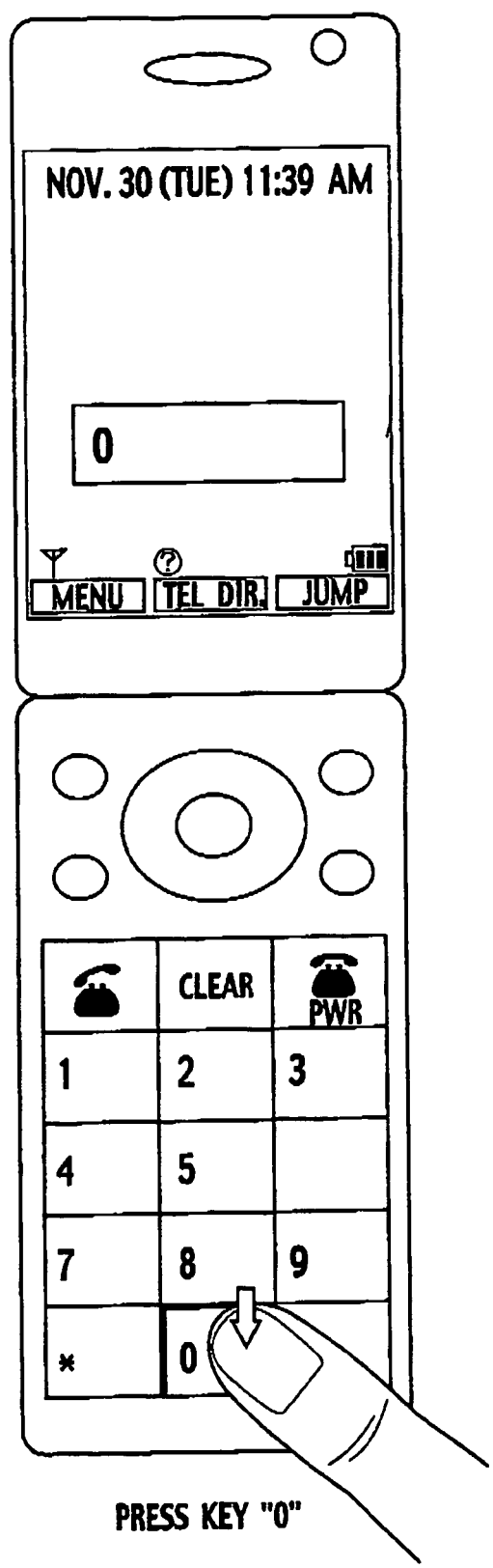
FIG. 8 is a view (part 3) showing the screen to be displayed on the display unit 20 according to the first embodiment of the present invention.

FIG. 8 is a view showing a screen to be displayed on the display unit 20 in a case where the user presses a "0" key for the touching time period shorter than the predetermined judging time. As shown in FIG. 8, the second function assigned to the "0" key, namely, the function to input "0," is executed. The number "0" is displayed on the display unit 20.

(Action and Effect)

According to the mobile terminal device 100 of the first embodiment, the display controller 15 displays, on the display unit 20, the explanation on the first function assigned to the key 30 in a case where the touching time period for the key 30 is equal to, or longer than, the predetermined judging time. Specifically, the mobile terminal device 100 causes output of the explanation on the first function to correspond to the touching time period for the key 30. Accordingly, the mobile terminal device 100 makes it possible for the user to easily notice that the explanation displayed on the display unit 20 represents the explanation on the first function.

Thus, the mobile terminal device 100 makes it possible to enhance user-friendliness even in a case where there are limitations on key sizes, and where the plurality of functions are assigned to each of the keys 30.

Second Embodiment

A mobile terminal device according to a second embodiment of the present invention will be described below with reference to the accompanying drawings. Hereinafter, differences from the above-mentioned first embodiment will be mainly described.

Specifically, in the above-described first embodiment, the explanation on the first function assigned to the key 30 is displayed in a case where the user continues to touch the same key 30 over the predetermined judging time or longer.

On the other hand, in the second embodiment, in a case where the user continues to touch a certain key 30 over the predetermined judging time or longer, after which the user touches a different key 30, the explanation on the first function assigned to the different key 30 is displayed even when the touching time period for the different key 30 is shorter than the predetermined judging time.

(Operations of Mobile Terminal Device)

Figure 9:
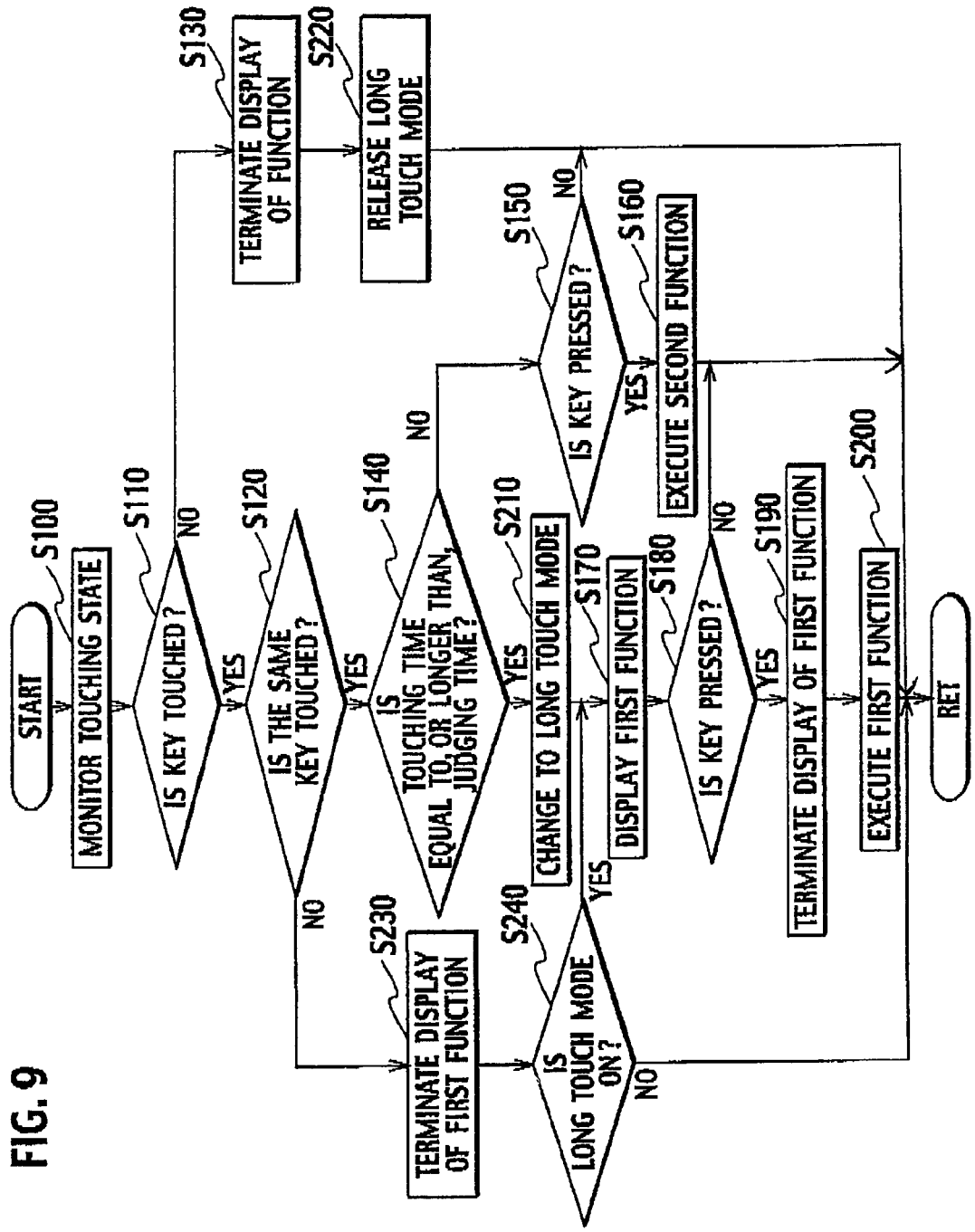
FIG. 9 is a flowchart showing operations of a mobile terminal device 100 according to a second embodiment of the present invention.

Descriptions will be provided below for operations of the mobile terminal device 100 according to the second embodiment of the present invention with reference to the accompanying drawing. FIG. 9 is a flowchart showing the operations of the mobile terminal device 100 according to the second embodiment of the present invention. In FIG. 9, the processes identical to those shown in the flowchart of FIG. 5 are designated by the same step numbers.

As shown in FIG. 9, in step S210, the mobile terminal device 100 is changed over to a long touch mode. Incidentally, the processing in Step S210 is the processing to be executed in a case where the touching time period for the key 30 is judged to be equal to, or longer than, the predetermined judging time in Step S140.

In Step S220, the mobile terminal device 100 releases the long touch mode. In this event, the processing in Step S220 is the processing to be executed in a case where the judgment is made in Step S110 that the user does not touch the key 30.

In Step S230, the mobile terminal device 100 terminates the display of the explanation on the first function displayed on the display unit 20.

In Step S240, the mobile terminal device 100 judges whether or not the mobile terminal device 100 is changed over to the long touch mode. The mobile terminal device 101 proceeds to the processing in Step S170 in a case where the mobile terminal device 100 is changed over to the long touch mode. The mobile terminal device 100 returns to the processing in Step S100 in a case where the mobile terminal-device 100 is not changed over to the long touch mode.

As described above, in a case where the touching time period for one of the keys 30 is equal to, or longer than, the predetermined judging time, after which the user touches the different key 30 while touching the certain key 30, the mobile terminal device 100 displays the explanation on the first function assigned to the different key 30. In this state, the mobile terminal device 100 executes the first function assigned to the different key 30 at the time when the user presses the different key 30.

Specifically, the long touch mode is the mode to display the explanation on the first function assigned to the key 30 and to execute the first function assigned to the key 30 even when the touching time period for the key 30 is shorter than the predetermined judging time.

(Display Screen)

Figure 10:
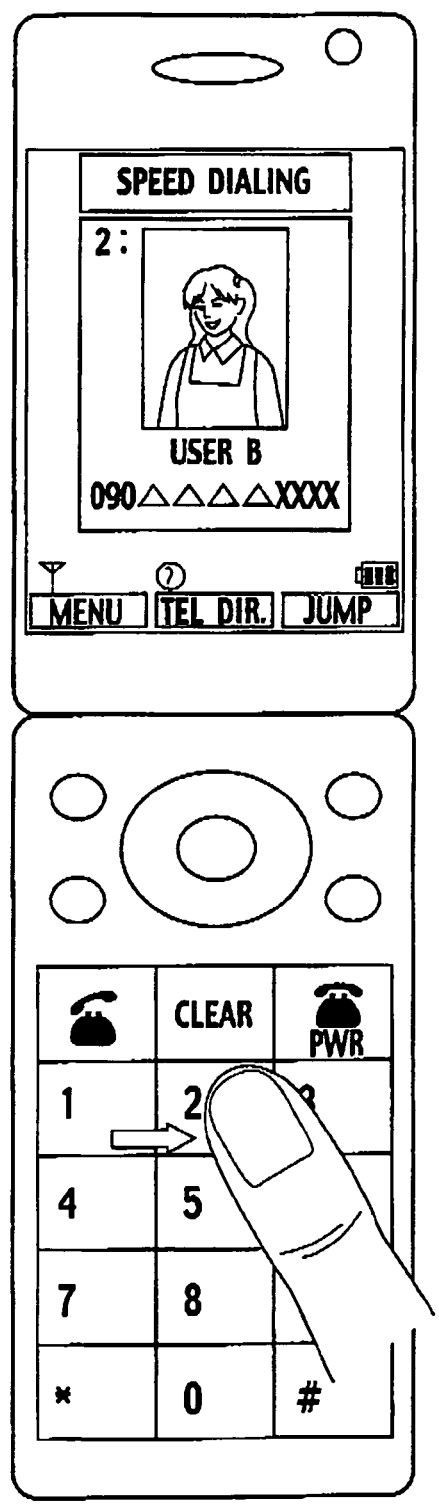
FIG. 10 is a view showing a screen to be displayed on a display unit 20 according to the second embodiment of the present invention.

Descriptions will be provided below for a screen to be displayed on the display unit 20 according to the second embodiment of the present invention with reference to the accompanying drawing. FIG. 10 is a view showing a screen to be displayed on the display unit 20 according to the second embodiment of the present invention.

To be more precise, FIG. 10 is the view showing the screen to be displayed on the display unit 20 in a case where the user continues to touch the "1" key over the predetermined judging time or longer, after which the user touches the "2" key while touching one of the keys 30.

As shown in FIG. 10, the explanation on the first function assigned to the key "2", namely, the function to make a phone call to the user B (a name, a telephone number, and a portrait of the user B), is displayed on the display unit 20 even when the touching time period for the "2" key is shorter than the predetermined judging time.

In the second embodiment, the long touch mode is released in a case where the judgment is made in Step S110 that the user does not touch the key 30. However, the present invention is not limited to this configuration. The long touch mode may be released after a predetermined period of time elapses from the point of the judgment that the user does not touch the key 30.

Moreover, in the second embodiment, in a case where the user continues to touch the certain key 30 over the predetermined judging time or longer, after which the user touches the different key 30, the explanation on the first function assigned to the different key 30 is displayed immediately after the explanation on the first function assigned to the certain key 30. However, the present invention is not limited to this configuration. For example, a standby screen may be displayed once after the explanation on the certain key 30 is displayed and before the explanation on the different key 30 is displayed.

(Action and Effect)

According to the mobile terminal device 100 of the second embodiment, in a case where the user continues to touch the certain key 30 over the predetermined judging time or longer, after which the user touches the different key 30, the display section 15 displays the explanation on the first function assigned to the different key 30 even when the touching time period for the different key 30 is shorter than the predetermined judging time.

Hence, even in a case where the user does not desire to execute the first function assigned to the key 30 which the user touches for the predetermined time period or longer, the user can easily search other first functions by touching the different keys 30.

In other words, the mobile terminal device 100 makes it possible to further enhance user-friendliness.

Third Embodiment

A mobile terminal device according to a third embodiment of the present invention will be described below with reference to the accompanying drawings. Hereinafter, differences from the above-mentioned first embodiment will be mainly described.

Specifically, only the explanation on the first function assigned to the key 30 is displayed in the above-described first embodiment. Meanwhile, in the third embodiment, the explanation on the second function assigned to the key 30 is also displayed in addition to the explanation on the first function assigned to the key 30.

(Key Assignment Information)

Descriptions will be provided below for the key assignment information according to the third embodiment of the present invention with reference to the accompanying drawing. FIG. 11 is a table showing the key assignment information according to the third embodiment of the present invention.

As shown in FIG. 11, the key assignment information is the information for associating the type of the keys 30 with the functions assigned to the respective keys 30, as in the case of the first embodiment. The first and second functions are assigned to each of the keys 30. Specifically, the first function is executed in a case where the touching time period of the time when the key 30 is pressed is equal to, or longer than, the predetermined judging time. The second function is executed in a case where the touching time period of the time when the key 30 is pressed is shorter than the predetermined judging time.

For example, as the first function, a function to call a mail edit screen is assigned to a "S/W (1)" key. As the second function, a function to call a menu screen is assigned thereto.

(Operations of Mobile Terminal Device)

Descriptions will be provided for operations of the mobile terminal device 100 according to the third embodiment of the present invention with reference to the accompanying drawings. FIG. 12 is a flowchart showing the operations of the mobile terminal device 100 according to the third embodiment of the present invention. In FIG. 12, the processes identical to those shown in the flowchart of FIG. 5 are designated by the same step numbers.

As shown in FIG. 12, in step S310, the mobile terminal device 100 displays, on the display unit 20, the explanation on the second function which is assigned to the key 30 touched by the user. For example, in a case where the touching time period for the "S/W (1)" key is shorter than the predetermined judging time, the mobile terminal device 100 displays, on the display unit 20, the second function assigned to the "S/W (1)" key, namely, the explanation on the function to call the menu screen (a character string stating "menu"). Incidentally, the processing in Step S310 is carried out in a case where the judgment is made in Step 5140 that the touching time period for the key 30 is shorter than the predetermined judging time.

In Step S320, the mobile terminal device 100 terminates the display of the explanation on the second function displayed on the display unit 20. Incidentally, the processing in Step S320 is carried out in a case where the judgment is made in Step S150 that the key 30 is pressed.

(Display Screen)

Hereinafter, descriptions will be provided for transition of screens to be displayed on the display unit 20 according to the third embodiment of the present invention with reference to the accompanying drawings. FIG. 13 to FIG. 16 are views respectively showing screens to be displayed on the display unit 20 according to the third embodiment of the present invention.

Figure 13:
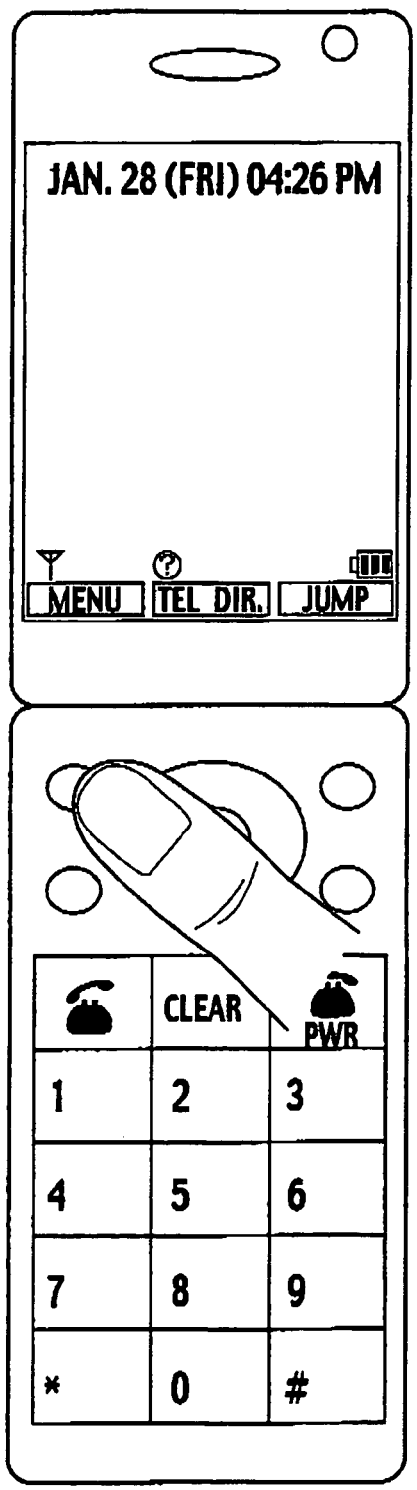
FIG. 13 is a view (part 1) showing a screen to be displayed on a display unit 20 according to the third embodiment of the present invention.

FIG. 13 is a view showing a screen to be displayed on the display unit 20 in a case where the touching time period for the "S/W (1)" key is shorter than the predetermined judging time. As shown in FIG. 13, the explanation on the second function assigned to the "S/W (1)" key, namely, the explanation on the function to call the menu screen (the character string stating "menu"), is displayed on the display unit 20. Moreover, explanations on the second functions assigned to an "enter" key and a "S/W (2)" key, namely, an explanation on a function to call a telephone directory (a character string stating "telephone directory") and a function to call a jump screen, in which shortcut functions set up by the user are arranged (a character string stating "jump"), are also displayed on the display unit 20.

Figure 14:
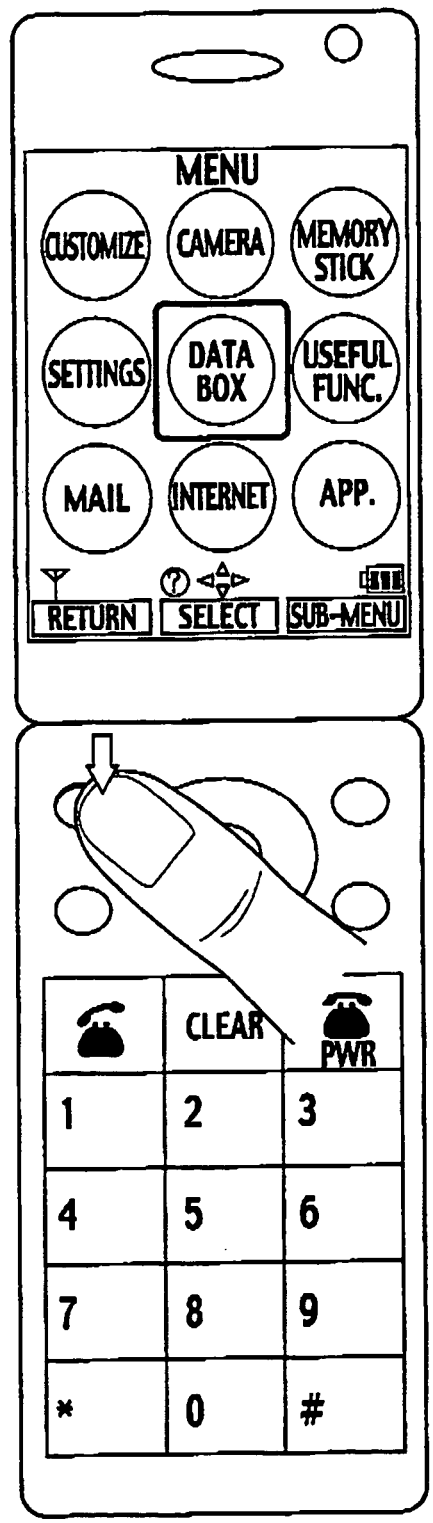
FIG. 14 is a view (part 2) showing the screen to be displayed on the display unit 20 according to the third 6 embodiment of the present invention.

FIG. 14 is a view showing a screen to be displayed on the display unit 20 in a case where the user presses the "S/W (1)" key in the state shown in FIG. 13. As shown in FIG. 14, the second function assigned to the "S/W (1)" key, namely, the function to call the menu screen, is executed. The menu screen is displayed on the display unit 20.

Figure 15:
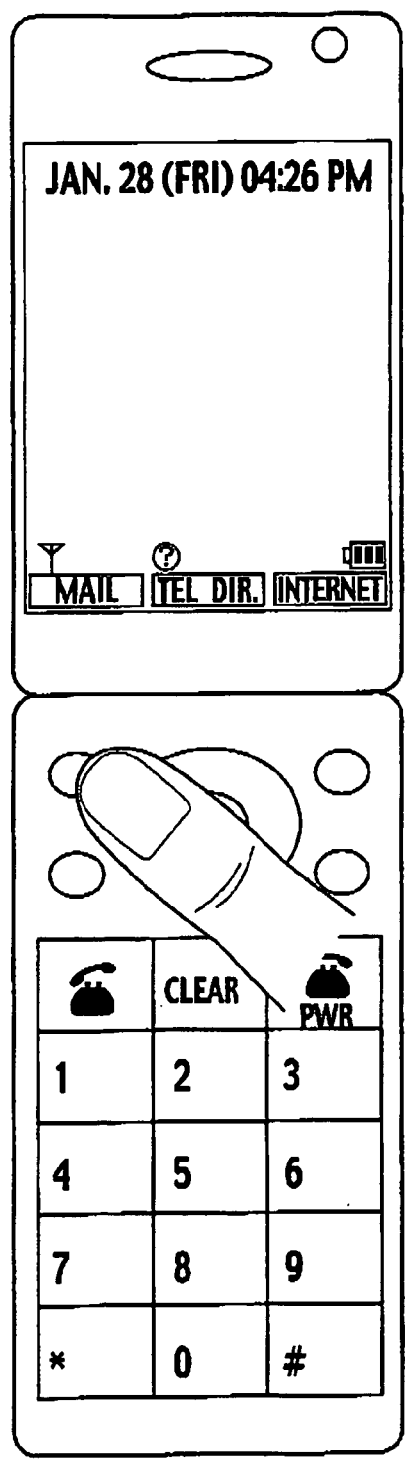
FIG. 15 is a view (part 3) showing the screen to be displayed on the display unit 20 according to the third embodiment of the present invention.

FIG. 15 is a view showing a screen to be displayed on the display unit 20 in a case where the touching time period for the "S/W (1)" key is equal to, or longer than, the predetermined judging time. As shown in FIG. 15, an explanation on the first function assigned to the "S/W (1)" key, namely, an explanation on a function to call a mail edit screen (a character string stating "mail"), is displayed on the display unit 20. In addition, the explanations on the first functions assigned to the "enter" key and the "S/W (2)" key, namely, the explanation on the function to call the telephone directory (the character string stating "telephone directory") and an explanation on a function to use the Internet (a character string stating "Internet" ), are also displayed on the display unit 20.

Figure 16:
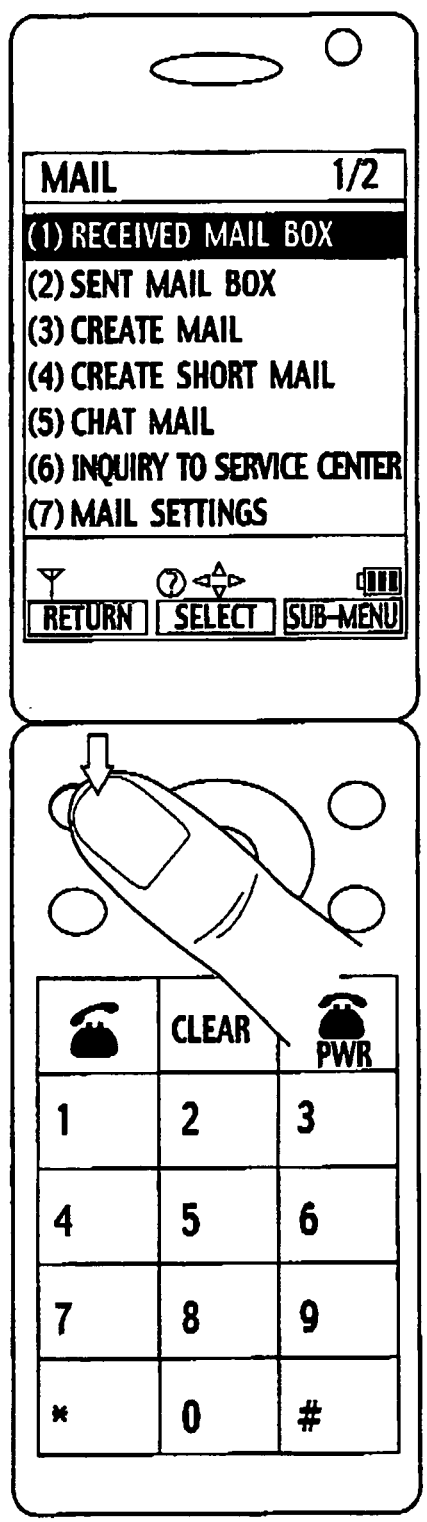
FIG. 16 is a view (part 4) showing the screen to be displayed on the display unit 20 according to the third embodiment of the present invention.

FIG. 16 is a view showing a screen to be displayed on the display unit 20 in a case where the user presses the "S/W (1)" key in the state shown in FIG. 15. As shown in FIG. 16, the first function assigned to the "S/W (1)" key, namely, the function to call the mail edit screen, is executed. The mail edit screen is displayed on the display unit 20.

In the third embodiment, in a case where the touching time period for the "S/W (1)" key is shorter than the predetermined judging time, the explanations on the second functions assigned to the "enter" key and the "S/W (2)" key are also displayed in addition to the explanation on the second function assigned to the "S/W (1)" key. However, the present invention is not limited to this configuration. It is also possible to display only the explanation on the second function assigned to the "S/W (1)" key.

(Action and Effect)

According to the mobile terminal device 100 of the third embodiment of the present invention, the display controller 15 displays the explanation on the second function assigned to any of the keys 30 in addition to the explanation on the first function assigned to the same key 30.

Specifically, the mobile terminal device 100 switches the displays on the plurality of functions assigned to one of the keys 30 depending on the touching time period for that key 30. Accordingly, the mobile terminal device 100 makes it possible for the user to easily notice the plurality of functions assigned to the key 30, and to reduce the cases of false operations.

Furthermore, even when the function, which is different from that indicated by the explanation printed on a given key 30, is assigned to the same key 30, it is made possible for the user to easily notice the functions assigned to the key 30.

Fourth Embodiment

A mobile terminal device according to a fourth embodiment of the present invention will be described below with reference to the accompanying drawings. Hereinafter, differences from the above-mentioned third embodiment will be mainly described.

Specifically, in the above-described third embodiment, only the explanation on the first function assigned to the key 30 is displayed on the display unit 20 in a case where the touching time period for the key 30 is equal to, or longer than, the predetermined judging time. In the fourth embodiment, all of the explanations on the first functions assigned to the respective keys 30 are displayed on the display unit 20 in a case where the touching time period for any of the keys 30 is equal to, or longer than, the predetermined judging time.

In the fourth embodiment, in a case where the touching time period for any of the keys 30 is shorter than the predetermined judging time, all of the explanations on the second functions assigned to the respective keys 30 are displayed on the display unit 20.

(Key Assignment Information)

Descriptions will be provided below for the key assignment information according to the fourth embodiment of the present invention with reference to the accompanying drawings. FIG. 17 is a table showing the key assignment information according to the fourth embodiment of the present invention.

As shown in FIG. 17, the key assignment information is the information for associating the type of the keys 30 with the functions assigned to the respective keys 30, as in the case of the third embodiment. The first and second functions are assigned to each of the keys 30. Specifically, the first is function is executed in a case where the touching time period of the time when the key 30 is pressed is equal to, or longer than, the predetermined judging time. The second function is executed in a case where the touching time period of the time when the key 30 is pressed is shorter than the predetermined judging time.

For example, as the first function, a function to call a screen for using a bar code reader is assigned to the "1" key, and as the second function, a function to call a customization screen for modifying settings of the mobile terminal device 100 is assigned thereto.

(Operations of Mobile Terminal Device)

Figure 18:
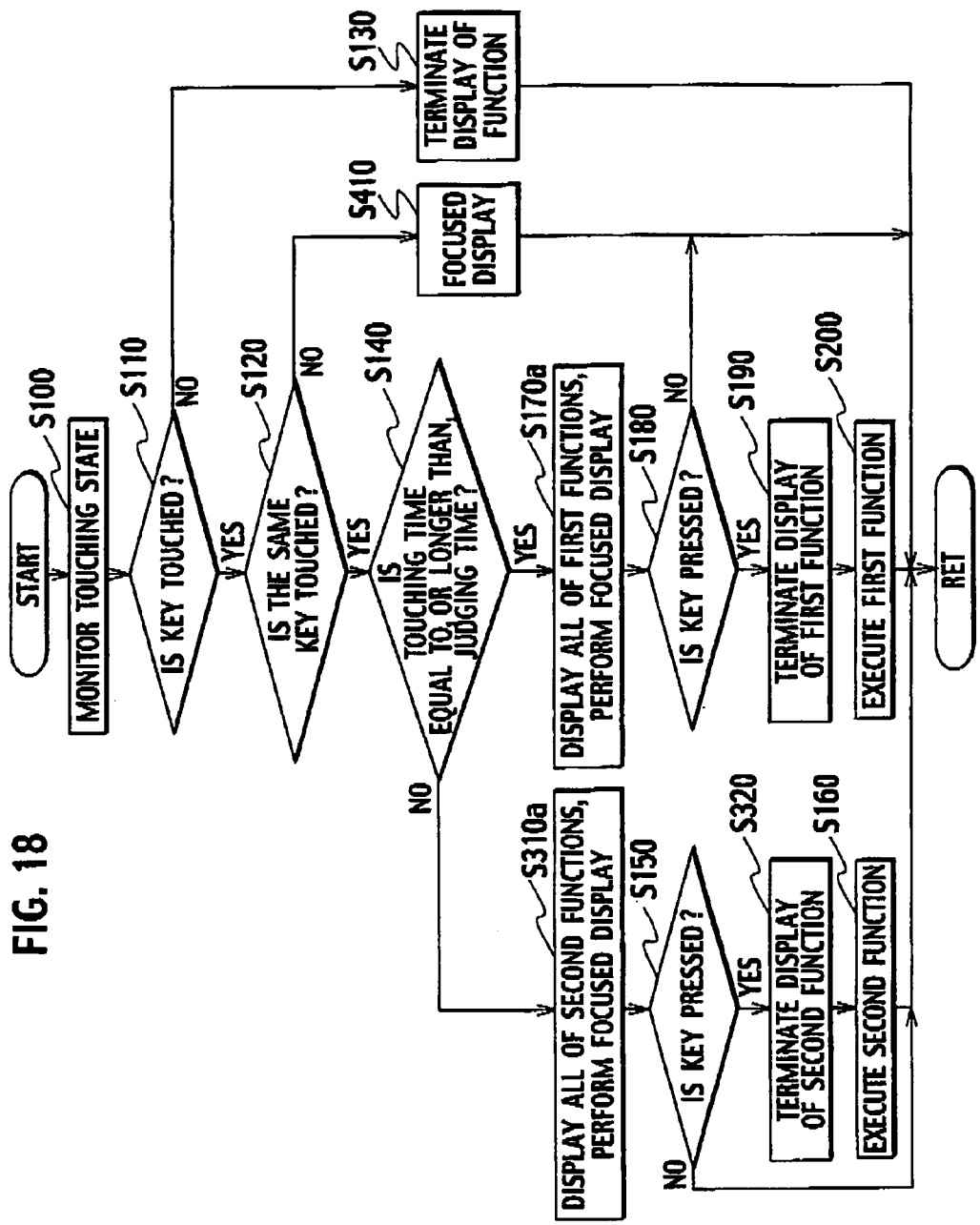
FIG. 18 is a flowchart showing operations of a mobile terminal device 100 according to the fourth embodiment of the present invention.

Descriptions will be provided below for operations of the mobile terminal device 100 according to the fourth embodiment of the present invention with reference to the accompanying drawings. FIG. 18 is a flowchart showing the operations of the mobile terminal device 100 according to the fourth embodiment of the present invention. In FIG. 18, the processes identical to those shown in the flowchart of FIG. 12 are designated by the same step numbers.

As shown in FIG. 18, in Step S170a, the mobile terminal device 100 displays, on the display unit 20, all of the explanations on the first functions assigned to the respective keys 30. Additionally, the mobile terminal device 100 displays, on the display unit 20, the explanation on the first function, which is assigned to the key 30 touched by the user, in a state where the display of the explanation is focused. Incidentally, the processing in Step S170a is carried out in a case where the judgment is made in Step S140 that the touching time period for is any of the keys 30 is equal to, or longer than, the predetermined judging time.

For example, in a case where the touching time period for the "1" key is equal to, or longer than, the predetermined judging time, the mobile terminal device 100 displays, on the display unit 20, all of the explanations on the first functions (all of icons indicating the first functions) respectively assigned to the keys "1" to "9." In addition, the mobile terminal device 100 displays the explanation on the first function assigned to the "1" key, namely, the function to call the screen for using the bar code reader (such as a character string stating "bar code reader"), in a state where the display of the explanation is focused.

In Step S310a, the mobile terminal device 100 displays, on the display unit 20, all of the explanations on the second functions assigned to the respective keys 30. Moreover, the mobile terminal device 100 displays, on the display unit 20, the explanation on the second function, which is assigned to the key 30 touched by the user, in a state where the display of the explanation is focused. Incidentally, the processing in Step S310a is carried out in a case where the judgment is made in Step S140 that the touching time period for any of the keys 30 is shorter than the predetermined judging time.

For example, in a case where the touching time period for the "1" key is shorter than the predetermined judging time, the mobile terminal device 100 displays, on the display unit 20, all of the explanations on the second functions (all of the icons indicating the second functions) respectively assigned to the keys "1" to "9". Moreover, the mobile terminal device 100 displays the explanation on the second function assigned to the "1" key, namely, the function to call the customization screen (such as a character string stating "customize"), in a state where the display of the explanation is focused.

In Step S410, the mobile terminal device 100 displays, on the display unit 20, the explanation on the function, which is assigned to the key 30 touched by the user, in a state where the display of the explanation is focused. To be more precise, in a case where all of the explanations on the first functions are displayed on the display unit 20, the mobile terminal device 100 displays the explanation on the first function, which is assigned to the key 30 touched by the user, in a state where the display of the explanation is focused. On the other hand, in a case where all of the explanations on the second functions are displayed on the display unit 20, the mobile terminal device 100 displays the explanation on the second function, which is assigned to the key 30 touched by the user, in a state where the display of the explanation is focused.

(Display Screen)

Descriptions will be provided below for transition of screens to be displayed on the display unit 20 according to the fourth embodiment of the present invention with reference to the accompanying drawings. FIG. 19 to FIG. 24 are views respectively showing screens to be displayed on the display unit 20 according to the fourth embodiment of the present invention.

Figure 19:
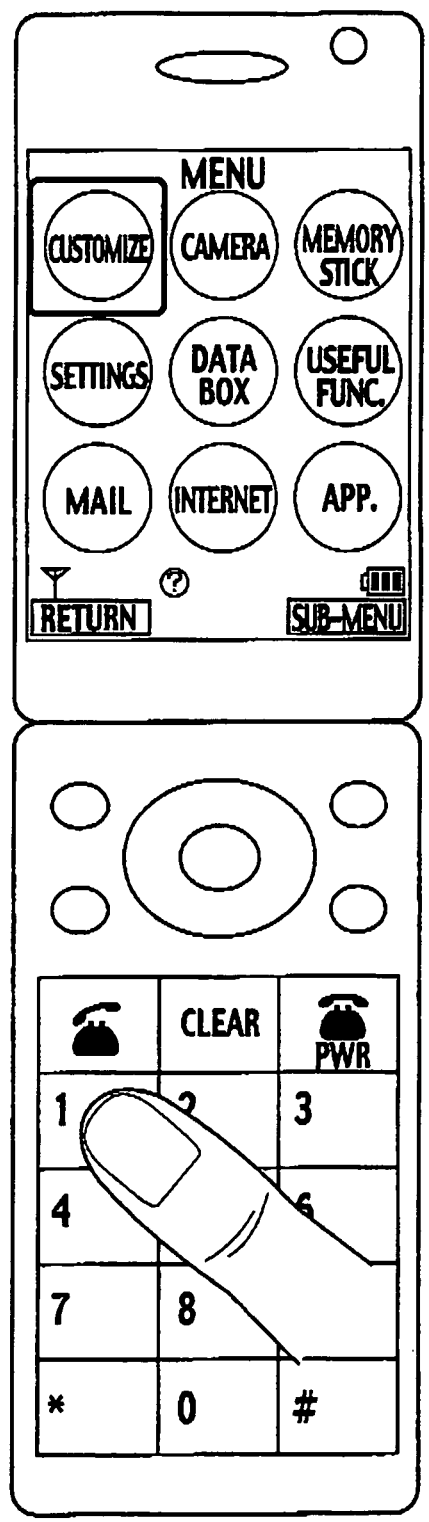
FIG. 19 is a view (part 1) showing a screen to be displayed on a display unit 20 according to the fourth embodiment of the present invention.

FIG. 19 is a view showing a screen to be displayed on the display unit 20 in a case where the touching time period for the "1" key is shorter than the predetermined judging time. As shown in FIG. 19, all of the explanations on the second functions assigned to the respective keys 30 are displayed on the display unit 20. Moreover, the explanation on the second function which is assigned to the "1" key touched by the user, namely, the function to call the customization screen (such as the character string stating "customize"), is displayed on the display unit 20 in a state where the display of the explanation is focused.

Figure 20:
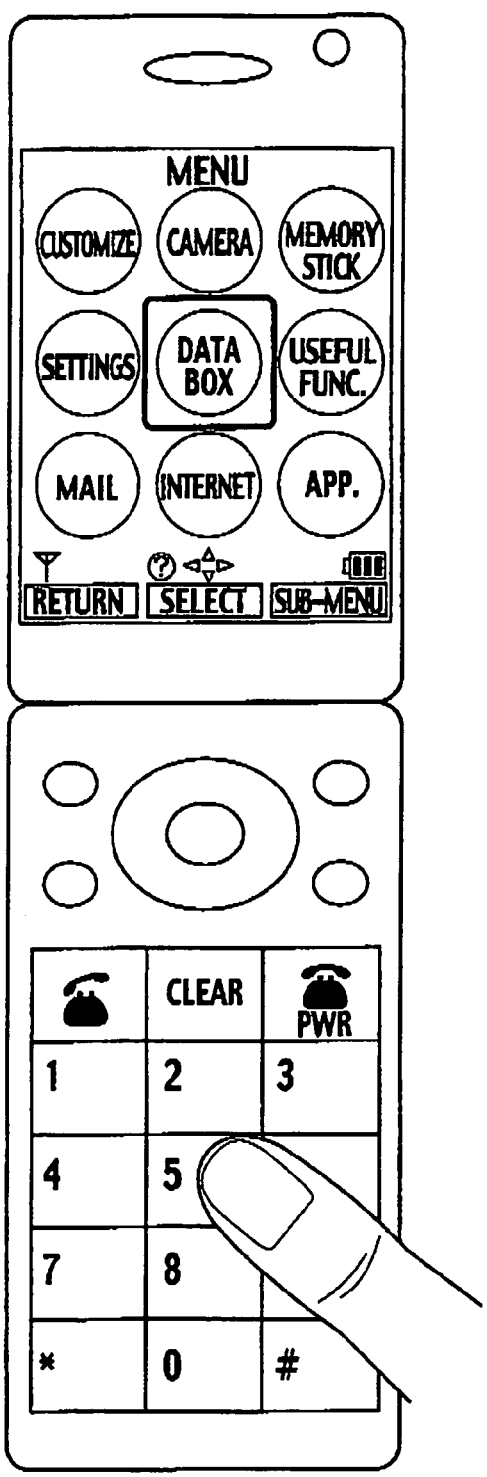
FIG. 20 is a view (part 2) showing the screen to be displayed on the display unit 20 according to the fourth embodiment of the present invention.

FIG. 20 is a view showing a screen to be displayed on the display unit 20 in a case where the user touches the "5" key while touching any of the other keys 30 in the state shown in FIG. 19. As shown in FIG. 20, all of the explanations on the second functions assigned to the respectively keys 30 are continuously displayed on the display unit 20. An explanation on the second function, which is assigned to the "5" key touched by the user, namely, an explanation on a function to call a screen for editing a data box (such as a character string stating "data box"), is displayed on the display unit 20 in a state where the display of the explanation is focused.

Figure 21:
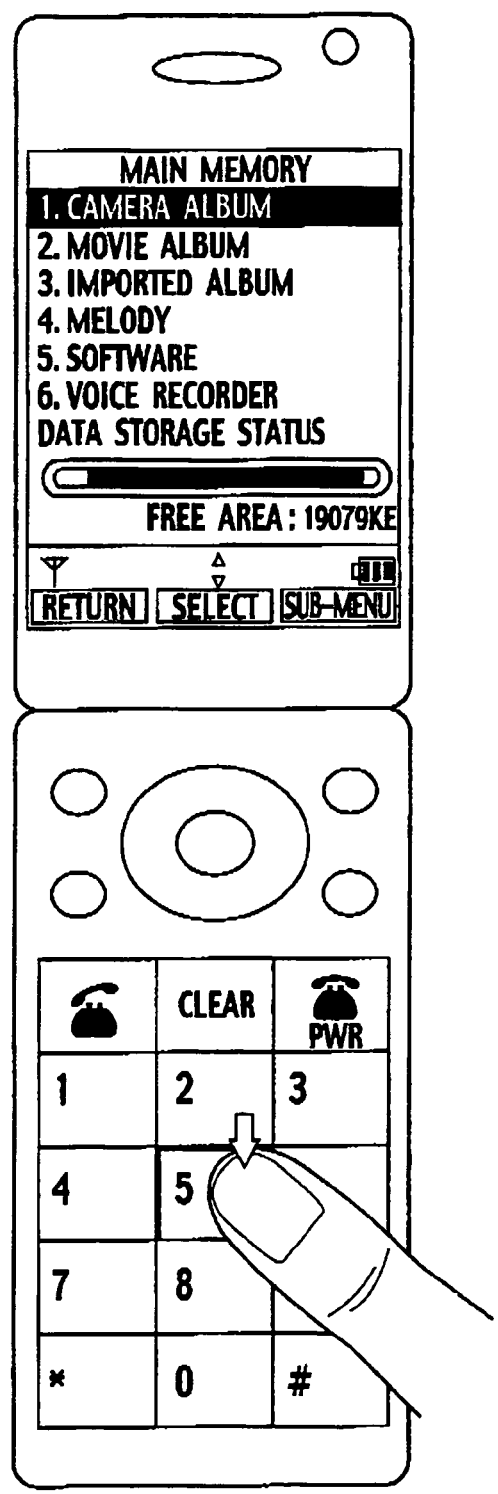
FIG. 21 is a view (part 3) showing the screen to be displayed on the display unit 20 according to the fourth embodiment of the present invention.

FIG. 21 is a view showing a screen to be displayed on the display unit 20 in a case where the user presses the "5" key in the state shown in FIG. 20. As shown in FIG. 21, the second function which is assigned to the "5" key pressed by the user, namely, the function to call the screen for editing the data box, is executed. The screen for editing the data box is displayed on the display unit 20.

Figure 22:
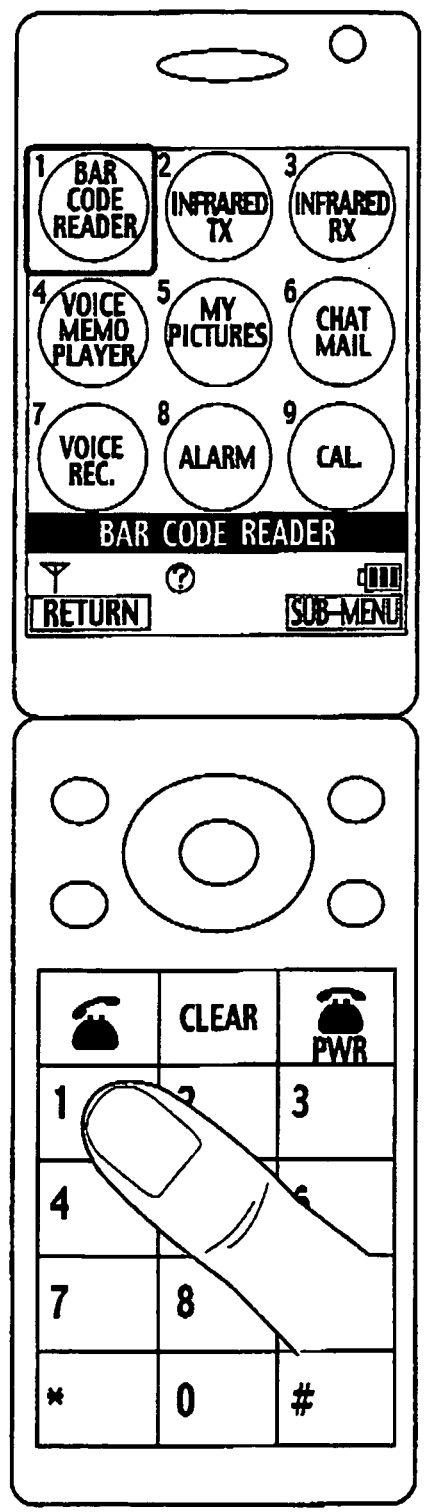
FIG. 22 is a view (part 4) showing the screen to be displayed on the display unit 20 according to the fourth embodiment of the present invention.

FIG. 22 is a view showing a screen to be displayed on the display unit 20 in a case where the touching time period for the "1" key is equal to, or longer than, the predetermined judging time. As shown in FIG. 22, all of the explanations on the first functions assigned to the respective keys 30 are displayed on the display unit 20. Moreover, the explanation on the first function, which is assigned to the "1" key touched by the user, namely, the function to call the screen for using the bar code reader (such as the character string stating "bar code reader"), is displayed on the display unit 20 in a state where the display of the explanation is focused.

Figure 23:
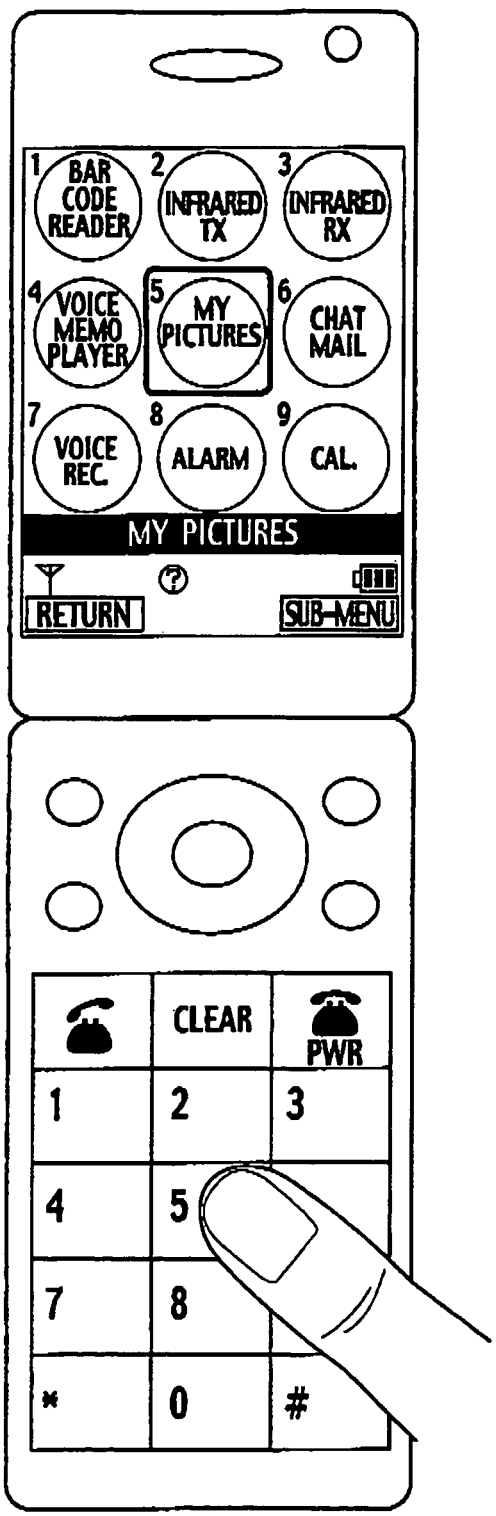
FIG. 23 is a view (part 5) showing the screen to be displayed on the display unit 20 according to the fourth embodiment of the present invention.

FIG. 23 is a view showing a screen to be displayed on the display unit 20 in a case where the user touches the "5" key while touching any of the other keys 30 in the state shown in FIG. 22. As shown in FIG. 23, all of the explanations on the first functions assigned to the respectively keys 30 are continuously displayed on the display unit 20. An explanation on the first function, which is assigned to the "5" key touched by the user, namely, an explanation on a function to call a screen for editing "my pictures" (such as a character string stating "my pictures"), is displayed on the display unit 20 in a state where the display of the explanation is focused.

Figure 24:
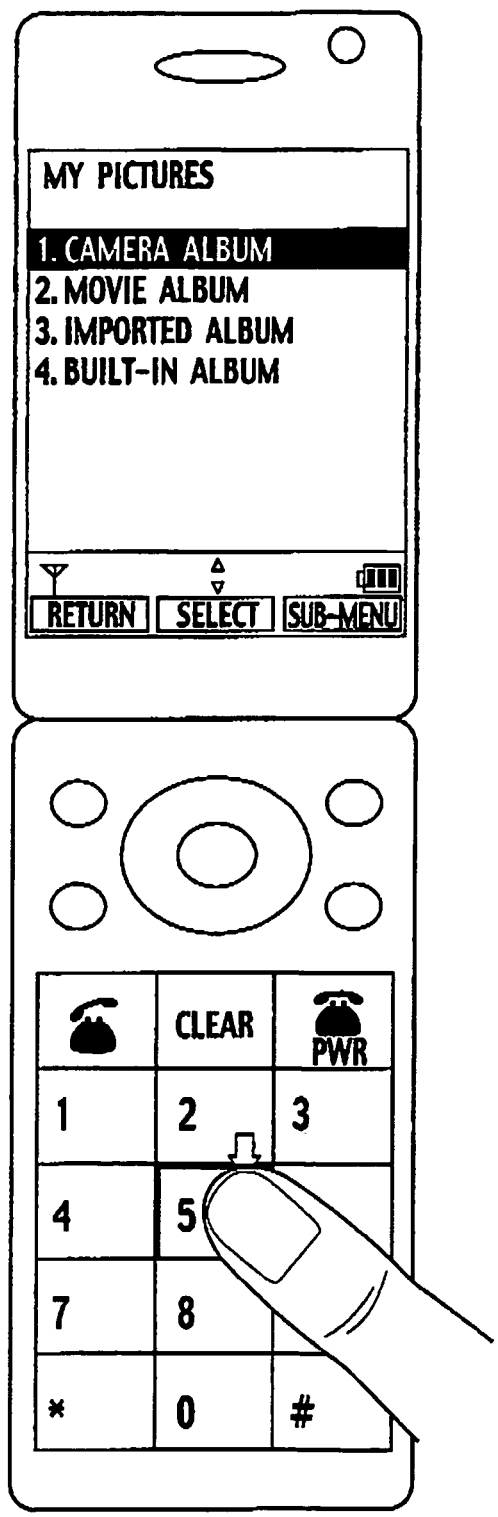
FIG. 24 is a view (part 6) showing the screen to be displayed on the display unit 20 according to the fourth embodiment of the present invention.

FIG. 24 is a view showing a screen to be displayed on the display unit 20 in a case where the user presses the "5" key in the state shown in FIG. 23. As shown in FIG. 24, the first function, which is assigned to the "5" key pressed by the user, namely, the function to call the screen for editing "my pictures," is executed. The screen for editing "my pictures" is displayed on the display unit 20.

In the fourth embodiment, when the key 30 touched by the user is changed from a certain key 30 to a different key 30 in a case where all of the explanations on the first functions are displayed, the explanation on the first function assigned to the different key 30 is displayed in a state where the display is focused. However, the present invention is not limited to this configuration.

Specifically, the touching time period may be reset when the key 30 touched by the user is changed from the certain key 30 to the different key 30. That is, in a case where the key 30 touched by the user is changed from the certain key 30 to the different key 30 in a case where all of the explanations on the first functions are displayed, the explanation on the second function assigned to the other key 30 may be displayed in a state where the display is focused.

Moreover, in the fourth embodiment, all of the explanations on the first functions assigned to the respective keys 30 are displayed in a case where the touching time period for the key 30 is equal to, or longer than, the predetermined judging time. All of the explanations on the second functions assigned to the respective keys 30 are displayed in a case where the touching time period for the key 30 is shorter than the predetermined judging time. However, the present invention is not limited to this configuration.

Specifically, in a case where the touching time period for the key 30 is equal to, or longer than, the predetermined judging time, all of the explanations on the first functions assigned to the keys 30 may be displayed. However, it is not necessary to display the explanations on the second functions in a case where the touching time period for the key 30 is shorter than the predetermined judging time.

(Action and Effect)

According to the mobile terminal device 100 of the fourth embodiment of the present invention, the display controller 15 displays, on the display unit 20, all of the explanations on the first functions assigned to the respective keys 30 in a case where the touching time period for any of the keys 30 is equal to, or longer than, the predetermined judging time.

Hence, it is made possible for the user to easily find the desired first function even when the user does not have knowledge of the first functions assigned to the respective keys 30. Accordingly, operation efficiency of the mobile terminal device 100 is increased.

Similarly, the display controller 15 displays all of the explanations on the second functions assigned to the respective keys 30 in a case where the touching time period for any of the keys 30 is shorter than the predetermined judging time.

For this reason, it is made possible for the user to easily find the desired second function even when the user does not have knowledge of the second functions assigned to the respective keys 30. Accordingly, operation efficiency of the mobile terminal device 100 is increased.

Fifth Embodiment

A mobile terminal device according to a fifth embodiment of the present invention will be described below with reference to the accompanying drawings. Hereinafter, differences from the above-mentioned fourth embodiment will be mainly described.

Specifically, in the above-described fourth embodiment, all of the explanations on the first functions assigned to the respective keys 30 are displayed in a case where the user touches any of the keys 30 over the predetermined judging time or longer. In the fifth embodiment, the explanation on the first function, which is assigned to the key 30 touched by the user over the predetermined judging time or longer, is displayed in a state where the display is enlarged.

(Operations of Mobile Terminal Device)

Figure 25:
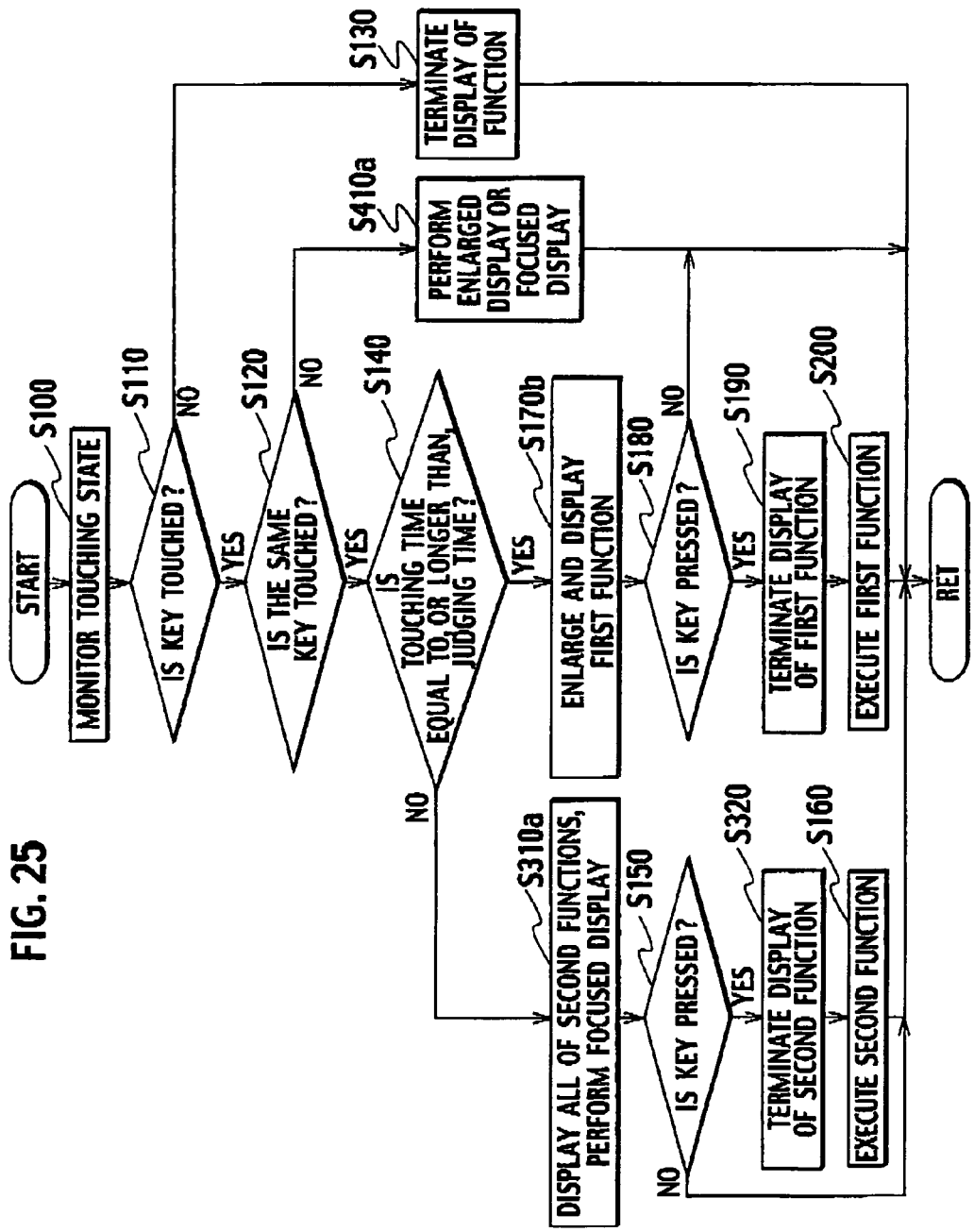
FIG. 25 is a flowchart showing operations of a mobile terminal device 100 according to a fifth embodiment of the present invention.

Descriptions will be provided below for operations of the mobile terminal device 100 according to the fifth embodiment of the present invention with reference to the accompanying drawing. FIG. 25 is a flowchart showing the operations of the mobile terminal device 100 according to the fifth embodiment of the present invention. In FIG. 25, the processes identical to those shown in the flowchart of FIG. 18 are designated by the same step numbers.

As shown in FIG. 25, in Step S170*b*, the mobile terminal device 100 displays, on the display unit 20, the explanation on the function, which is assigned to the key 30 touched by the user, in a state where the display of the explanation is enlarged. Incidentally, the processing in Step S170*b* is carried out in a case where the judgment is made in Step S140 that the touching time period for the key 30 is equal to, or longer than, the predetermined judging time.

In Step S410*a*, the mobile terminal device 100 displays the explanation on the first function, which is assigned to the key 30 touched by the user, in a state where the display of the explanation is either focused or enlarged. To be more precise, in a case where the explanation on the first function is displayed on the display unit 20 in a state where the display is enlarged, the mobile terminal device 100 terminates the enlarged display of the explanation on the first function, which is assigned to the key 30 previously touched by the user. Concurrently, the mobile terminal device 100 displays the explanation on the first function, which is assigned to the key 30 currently touched by the user, in a state where the display of the explanation is enlarged. On the other hand, in a case where all of the explanations on the second functions are displayed on the display unit 20, the mobile terminal device 100 terminates the focused display of the explanation on the second function, which is assigned to the key 30 previously touched by the user. Concurrently, the mobile terminal device 100 displays the explanation on the second function, which is assigned to the key 30 currently touched by the user, in a state where the display of the explanation is focused.

(Display Screen)

Figure 26:
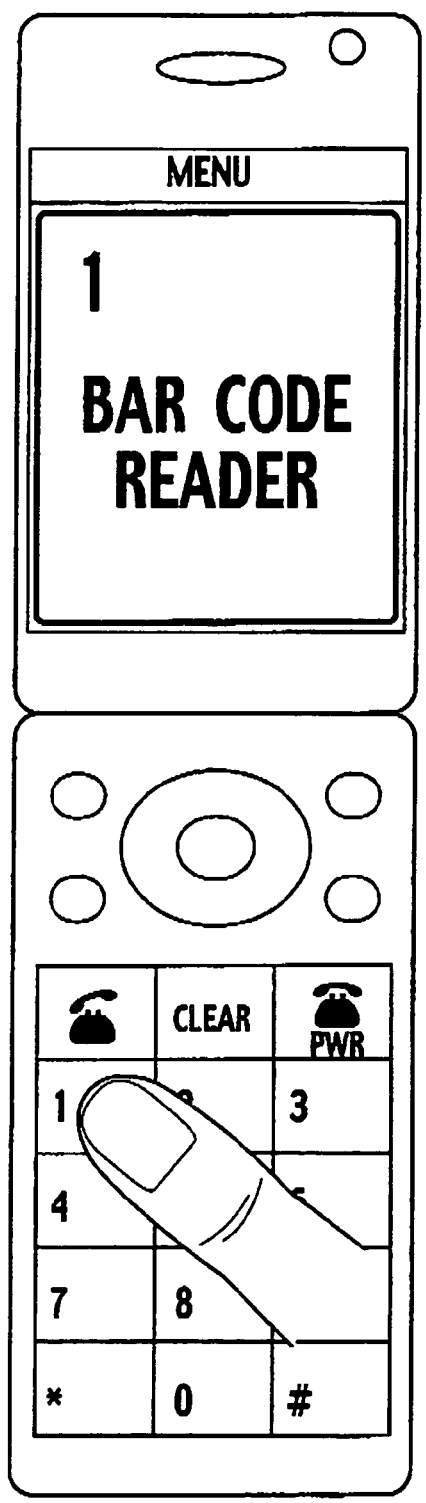
FIG. 26 is a view (part 1) showing a screen to be displayed on a display unit 20 according to the fifth embodiment of the present invention.
Figure 27:
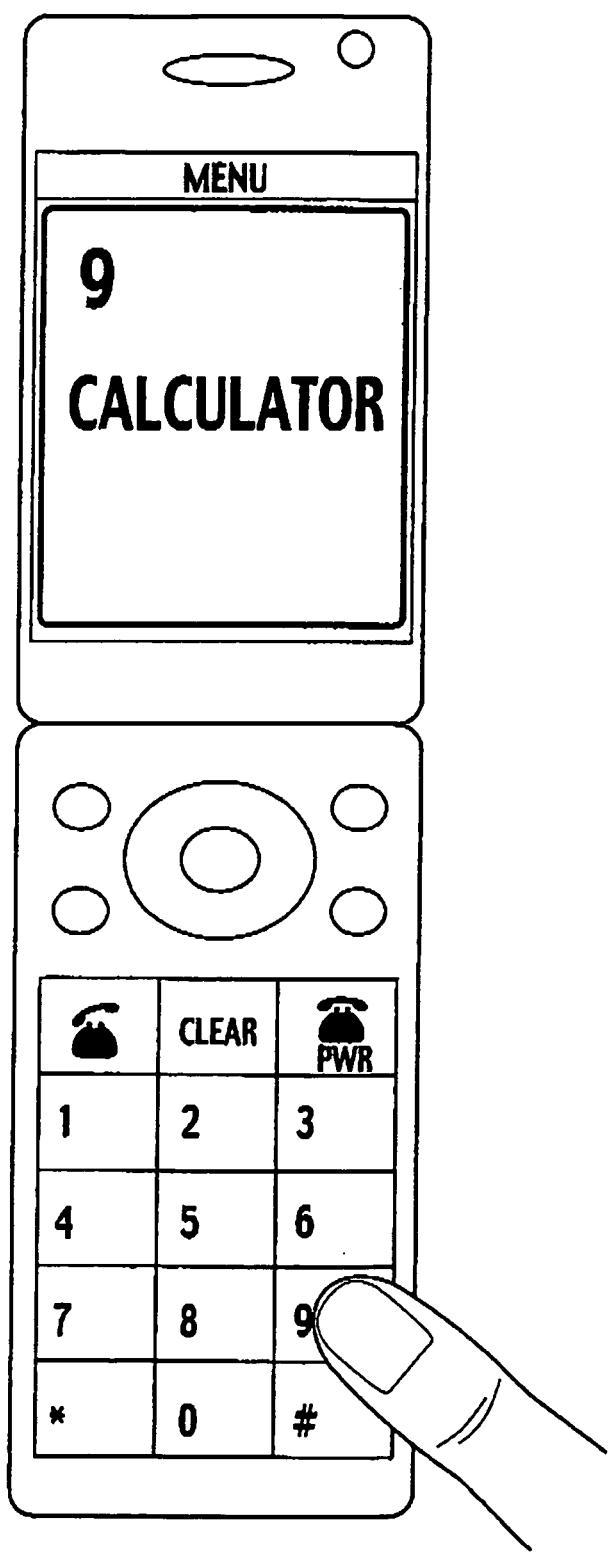
FIG. 27 is a view (part 2) showing the screen to be displayed on the display unit 20 according to the fifth embodiment of the present invention.
Figure 28:
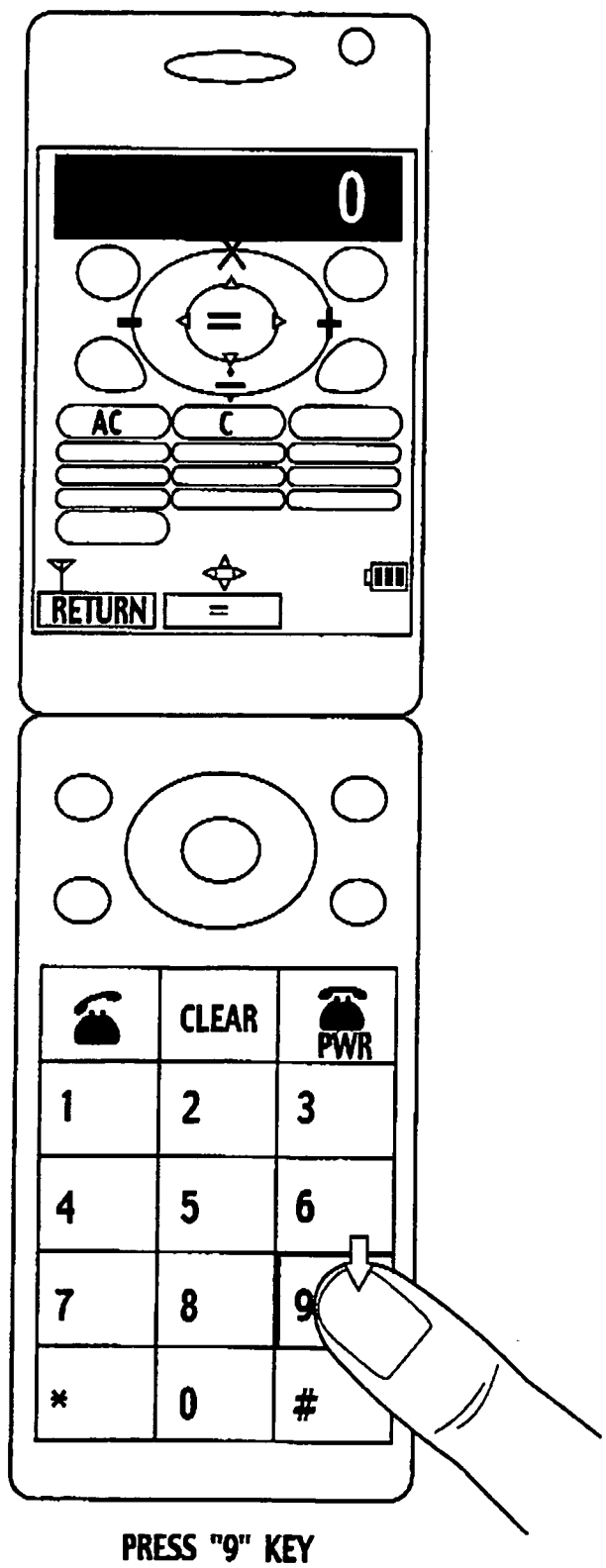
FIG. 28 is a view (part 3) showing the screen to be displayed on the display unit 20 according to the fifth embodiment of the present invention.

Descriptions will be provided below for transition of screens to be displayed on the display unit 20 according to the fifth embodiment of the present invention with reference to the accompanying drawings. FIG. 26 to FIG. 28 are views respectively showing screens to be displayed on the display unit 20 according to the fifth embodiment of the present invention.

FIG. 26 is a view showing a screen to be displayed on the display unit 20 in a case where the touching time period for the "1" key is equal to, or longer than, the predetermined judging time. As shown in FIG. 26, the explanation on the first function, which is assigned to the "1" key touched by the user, namely, the function to call the screen for using the bar code reader (such as the character string stating "bar code reader"), is displayed on the display unit 20 in a state where the display of the explanation is enlarged.

FIG. 27 is a view showing a screen to be displayed on the display unit 20 in a case where the user touches the "9" key while touching any of the other keys 30 in the state shown in FIG. 26. As shown in FIG. 27, an explanation on the first function, which is assigned to the "9" key touched by the user, namely, an explanation on a function to call a screen for using a calculator (such as a character string stating "calculator"), is displayed on the display unit 20 in a state where the display of the explanation is enlarged.

FIG. 28 is a view showing a screen to be displayed on the display unit 20 in a case where the user presses the "9" key in the state shown in FIG. 27. As shown in FIG. 28, the first function assigned to the "9" key pressed by the user, namely, the function to call the screen for using the calculator, is executed. The screen for using the calculator is displayed on the display unit 20.

(Action and Effect)

According to the mobile terminal device 100 of the fifth embodiment of the present invention, the display controller 15 displays, on the display unit 20, the explanation on the first function, which is assigned to the key 30 touched by the user over the predetermined judging time or longer, in a state where the display of the explanation is enlarged.

Accordingly, visibility of the respective explanations on the first functions assigned to the keys 30 is improved. Thereby, user-friendliness is enhanced.

MODIFIED EXAMPLES

In the above-described first to fifth embodiments, the user is notified of the explanations on the functions by way of the display on the display unit 20. However, the present invention is not limited to this configuration. The user may be notified of the explanations aurally or tactually. For example, the user may be notified of the explanations on the functions by means of audio, Braille, and the like.

Moreover, it is also possible to provide a program for causing a computer to execute the operations of the mobile terminal device 100 according to any of the first to fifth embodiments.

Furthermore, in the first to fifth embodiments, the touch pad 10b is configured to only detect touching the key 30 by the user. However, the present invention is not limited to this configuration. The touch pad 10b may be also configured to detect touching the key 30 and pressing the key 30 by the user.

In the first to fifth embodiments, the operations of the mobile terminal device 100 are designed as loop processing. However, the present invention is not limited to this configuration. The operations may be designed as interrupt processing in which detection by the touch pad 10b is used as a trigger. Alternatively, the operations may be designed as polling processing to be executed at an appropriate time interval so as to monitor user operations sufficiently.

In addition, a time period for pressing the key 30 by the user (hereinafter referred to as pressing time) is not remarked in particular in the first to fifth embodiments. However, it is also possible to switch the functions to be executed depending on the pressing time for the key 30.

Specifically, even in a case where the touching time period for the key 30 is shorter than the predetermined judging time, and where the explanation on the second function is displayed, the first function may be executed in a case where is the pressing time for the key 30 is equal to, or longer than, a predetermined time period. Similarly, even in a case where the touching time period for the key 30 is equal to, or longer than, the predetermined judging time, and where the explanation on the first function is displayed, the second function may be executed in a case where the pressing time for the key 30 is shorter than the predetermined time period.

What is claimed is:

1. A mobile terminal device comprising:
a plurality of keys, each of which are previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time;
a touch detector configured to detect touching any of the keys by a user;
a press detector configured to detect a depression of any of the keys by the user;
an output unit configured to simultaneously output explanations on all of the first functions previously assigned to all of the plurality of keys when a touching time period for which the user touches a first key of the plurality of keys is equal to, or longer than, the predetermined judging time; and
a function executor configured to execute the first function of a second key when the press detector detects a depression of the second key by the user in a case where the explanations on all of the first functions previously assigned to all of the plurality of keys are being simultaneously output and a touching time period for which the user touches the first key is equal to, or longer than, the predetermined judging time,
wherein the output unit simultaneously outputs all of the explanations on the first functions previously assigned to the respective keys on a display when the touching time period for any of the keys is equal to, or longer than, the predetermined judging time; and
the display unit displays the explanation on the first function previously assigned to the touched key in a state where the display of the explanation is in a manner which is emphasized or distinguished over the displays of the remaining explanations on the first functions of the remaining keys.

2. A method of operating a mobile terminal device provided with a plurality of keys, which are each previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time, the method comprising:
detecting touching any of the keys by a user;
detecting a depression of any of the keys by the user;
simultaneously outputting explanations on all of the first functions previously assigned to all of the plurality of keys when a touching time period for which the user touches a first key of the plurality of keys is equal to, or longer than, the predetermined judging time; and
executing the first function of a second key when the detecting a depression detects a depression of the second key by the user in a case where the all of the explanations on the first functions previously assigned to all of the plurality of keys are simultaneously being output and the touching time period for which the user touches the first key is equal to, or longer than, the predetermined judging time,
wherein all of the explanations on the first functions previously assigned to the respective keys are simultaneously outputted on a display in a case where the touching time period for any of the keys is equal to, or longer than, the predetermined judging time; and
the explanation on the first function previously assigned to the touched key is displayed on the display unit in a state where the display of the explanation is in a manner which is emphasized or distinguished over the displays of the remaining explanations on the first functions of the remaining keys.

3. A non-transitory computer-readable medium including computer program instructions, which when executed by a mobile terminal device provided with a plurality of keys, which are each previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time, causes the mobile terminal device to perform a method, comprising:
  detecting touching any of the keys by a user;
  detecting a depression of any of the keys by the user;
  simultaneously outputting explanations on all of the first functions previously assigned to each of the plurality of keys when a touching time period for which the user touches a first key of the plurality of keys is equal to, or longer than, the predetermined judging time; and
  executing the first function of a second key when the detecting a depression detects a depression of the second key by the user in a case where all of the explanations on the first functions previously assigned to all of the plurality of keys are simultaneously being output and the touching time period for which the user touches the first key is equal to, or longer than, the predetermined judging time,
  wherein all of the explanations on the first functions previously assigned to the respective keys are simultaneously outputted on a display in a case where the touching time period for any of the keys is equal to, or longer than, the predetermined judging time; and
  the explanation on the first function previously assigned to the touched key is displayed on the display unit in a state where the display of the explanation is in a manner which is emphasized or distinguished over the displays of the remaining explanations on the first functions of the remaining keys.

4. A mobile terminal device comprising:
  a plurality of keys, each of which are previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time;
  a touch detector configured to detect touching any of the keys by a user;
  a press detector configured to detect a depression of any of the keys by the user;
  an output unit configured to simultaneously output explanations on all of the second functions previously assigned to all of the plurality of keys when the touching time period for a first key is shorter than the predetermined judging time; and
  a function executor configured to execute the second function of a second key when the press detector detects a depression of the second key by the user in a case where all of the explanations on the second functions previously assigned to all of the plurality of keys are simultaneously being output and the touching time period for which the user touches the first key is shorter than the predetermined judging time,
  wherein the output unit simultaneously outputs all of the explanations on the second functions previously assigned to the respective keys on a display when the touching time period for any of the keys is equal to, or longer than, the predetermined judging time; and
  the display unit displays the explanation on the second function previously assigned to the touched key in a state where the display of the explanation is in a manner which is emphasized or distinguished over the displays of the remaining explanations on the second functions of the remaining keys.

5. A method of operating a mobile terminal device provided with a plurality of keys, which are each previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time, the method comprising:
  detecting touching any of the keys by a user;
  detecting a depression of any of the keys by the user;
  simultaneously outputting explanations on all of the second functions previously assigned to all of the plurality of keys when the touching time period for a first key is shorter than the predetermined judging time; and
  executing the second function of a second key when the detecting pressing a depression detects a depression of the second key by the user in a case where all of the explanations on the second functions previously assigned to all of the plurality of keys are simultaneously being output and the touching time period for which the user touches the first key is shorter than the predetermined judging time,
  wherein all of the explanations on the second functions previously assigned to the respective keys are simultaneously outputted on a display in a case where the touching time period for any of the keys is equal to, or longer than, the predetermined judging time; and
  the explanation on the second function previously assigned to the touched key is displayed on the display unit in a state where the display of the explanation is in a manner which is emphasized or distinguished over the displays of the remaining explanations on the second functions of the remaining keys.

6. A non-transitory computer-readable medium including computer program instructions, which when executed by a mobile terminal device provided with a plurality of keys, which are each previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time, causes the mobile terminal device to perform a method, comprising:
  detecting touching any of the keys by a user;
  detecting a depression of any of the keys by the user;
  simultaneously outputting explanations on all of the second functions previously assigned to all of the plurality of keys when the touching time period for a first key is shorter than the predetermined judging time; and
  executing the second function of a second key when the detecting pressing a depression detects a depression of the second key by the user in a case where all of the explanations on the second functions previously assigned to all of the plurality of keys are being simultaneously output and the touching time period for which the user touches the first key is shorter than the predetermined judging time, wherein all of the explanations on the first functions previously assigned to the respective keys are simultaneously outputted on a display in a case where the touching time period for any of the keys is equal to, or longer than, the predetermined judging time; and the explanation on the first function previously assigned to the touched key is displayed on the display unit in a state where the display of the explanation is in a manner which is emphasized or distinguished over the displays of the remaining explanations on the second functions of the remaining keys.

7. A mobile terminal device comprising:

a plurality of keys, each of which are previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time;

a touch detector configured to detect touching any of the keys by a user;

a press detector configured to detect a depression of any of the keys by the user;

an output unit configured to simultaneously output explanations on all of the first functions previously assigned to all of the plurality of keys when a touching time period for which the user touches a first key of the plurality of keys is equal to, or longer than, the predetermined judging time; and a function executor configured to execute the first function of a second key when the press detector detects a depression of the second key by the user in a case where the explanations on all of the first functions previously assigned to all of the plurality of keys is simultaneously output and a touching time period for which the user touches the first key is equal to, or longer than, the predetermined judging time, wherein the output unit simultaneously outputs all of the explanations on the first functions previously assigned to the respective keys on a display in a case where the touching time period for any of the keys is equal to, or longer than, the predetermined judging time; and the display displays the explanation on the first function previously assigned to the touched key in a state where the display of the explanation is enlarged.

8. A method of operating a mobile terminal device provided with a plurality of keys, which are each previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time, the method comprising:

detecting touching any of the keys by a user;

detecting a depression of any of the keys by the user;

simultaneously outputting, by an output unit, explanations on all of the first functions previously assigned to all of the plurality of keys when a touching time period for which the user touches a first key of the plurality of keys is equal to, or longer than, a predetermined judging time; and executing the first function of a second key when the detecting a depression detects a depression of the second key by the user in a case where all of the explanations on the first functions previously assigned to all of the plurality of keys are simultaneously output and the touching time period for any of the keys is equal to, or longer than, the predetermined judging time; and the output unit simultaneously outputs all of the explanations on the first functions previously assigned to the respective keys on a display in a case where the touching time period for any of the keys is equal to, or longer than, the predetermined judging time; and the display displays the explanation on the first function previously assigned to the touched key in a state where the display of the explanation is enlarged.

9. A non-transitory computer-readable medium including computer program instructions, which when executed by a mobile terminal device provided with a plurality of keys, which are each previously assigned different functions including at least a first function and a second function, the first function corresponding to a key that is depressed after one of the plurality of keys has been touched for equal to or longer than a predetermined judging time, and the second function corresponding to a key that is depressed after one of the plurality of keys has been touched for less than the predetermined judging time, causes the mobile terminal device to perform a method, comprising:

detecting touching any of the keys by a user;

detecting a depression of any of the keys by the user;

simultaneously outputting, by an output unit, explanations on all of the first functions previously assigned to all of the plurality of keys when a touching time period for which the user touches a first key of the plurality of keys is equal to, or longer than, a predetermined judging time; and executing the first function of a second key when the detecting a depression detects a depression of the second key by the user in a case where all of the explanations on the first functions previously assigned to all of the plurality of keys are simultaneously output and the touching time period for any of the keys is equal to, or longer than, the predetermined judging time; and the output unit simultaneously outputs all of the explanations on the first functions previously assigned to the respective keys on a display in a case where the touching time period for any of the keys is equal to, or longer than, the predetermined judging time; and the display displays the explanation on the first function previously assigned to the touched key in a state where the display of the explanation is enlarged.

* * * * *